(12) United States Patent
Chu et al.

(10) Patent No.: US 9,026,379 B2
(45) Date of Patent: May 5, 2015

(54) APPARATUS CAPABLE OF CONTROLLING, TRACKING AND MEASURING TIGHTENING TORQUE AND LOCKING FORCE, AND METHOD FOR CONTROLLING, TRACKING, MEASURING AND CALIBRATING THEREOF

(75) Inventors: Hsiu-Feng Chu, Taoyuan County (TW); Che-Min Lin, Taoyuan County (TW)

(73) Assignee: China Pneumatic Corporation, Taoyuan County (TW)

( * ) Notice: Subject to any disclaimer, the term of this patent is extended or adjusted under 35 U.S.C. 154(b) by 617 days.

(21) Appl. No.: 13/355,224

(22) Filed: Jan. 20, 2012

(65) Prior Publication Data

US 2012/0191378 A1    Jul. 26, 2012

(51) Int. Cl.
*G01L 5/24*   (2006.01)
*G01L 25/00*   (2006.01)

(52) U.S. Cl.
CPC .............. *G01L 5/24* (2013.01); *G01L 25/003* (2013.01)

(58) Field of Classification Search
CPC ........... G01L 1/22; G01L 5/00; G01L 5/0042; G01L 5/24; G01L 25/003; G01L 3/00; G01L 3/1464
USPC ............ 702/33, 41–44, 86, 104; 73/760, 761, 73/867.041
See application file for complete search history.

(56) References Cited

U.S. PATENT DOCUMENTS

| 2010/0050778 A1* | 3/2010 | Herley et al. ................... 73/761 |
| 2010/0054891 A1* | 3/2010 | Nishida et al. ................... 411/9 |
| 2010/0170370 A1* | 7/2010 | Yokoyama et al. ............. 81/479 |

FOREIGN PATENT DOCUMENTS

CN            101659048 A        3/2010

* cited by examiner

*Primary Examiner* — Manuel L Barbee
(74) *Attorney, Agent, or Firm* — Muncy, Geissler, Olds & Lowe, P.C.

(57) ABSTRACT

This invention discloses an apparatus capable of controlling, tracking and measuring the tightening torque and the locking force and a method thereof. The device comprises a control device, a transducing device, and a sensing device. The transducing device comprises a second connector and a first signal transmitter. The control device communicates with the transducing device through a second signal transmitter and the first signal transmitter wiredly or wirelessly. The sensing device comprises a first connector and a sensor, and electrically connects to the transducing device through the second connector and the first connector. The sensing device senses the torque applied to a fastener to transmit real-time sensing data to the control device. The control device compares the real-time sensing data with a setting value so as to measure, control or track the locking force or tightening torque applied to the fastener in real time.

6 Claims, 14 Drawing Sheets

APPARATUS CAPABLE OF CONTROLLING, TRACKING AND MEASURING TIGHTENING TORQUE AND LOCKING FORCE, AND METHOD FOR CONTROLLING, TRACKING, MEASURING AND CALIBRATING THEREOF

CROSS-REFERENCE TO RELATED APPLICATION

This application claims the benefit of U.S. Provisional Application No. 61/434,820, filed on Jan. 20, 2011, in the US Patent and Trademark Office, the disclosure of which is incorporated herein in its entirety by reference.

BACKGROUND OF THE INVENTION

1. Field of the Invention

The present invention generally relates to an apparatus for measuring the locking force or the tightening torque, in particular to an apparatus capable of controlling, tracking and measuring the tightening torque and the locking force, and a method for controlling, tracking, measuring and calibrating thereof.

2. Description of the Related Art

Fastener is used widely in miscellaneous products. The bigger the product size is, the greater the locking force for fastener it needs. However, when fasteners are utilized to tighten components, how to determine whether or not the locking force or the tightening torque applied to the fasteners has reached the desired standard? Generally speaking, conventional method usually utilizes a tightening tool and ultrasonic device to measure the locking force or the tightening torque. However, tightening tool can just measure the magnitude of the tightening torque of the fastener and the user thereof tends to excessively exert force on the fastener, so that the fastener is inclined to be damaged or broken. For example, when a fastener is utilized to tighten up a wheel rim of a car, excessive force exerted to the fastener will make the locking force applied to the fastener exceed the tolerable maximum locking force thereof, which would result in damages to the fastener or even the wheel rim. Accordingly, when a car moves at high speed or suffers great impact force, the damaged fastener tends to be fractured and thereby causes the wheel rim to drop from the car, which would bring about a major car accident. Besides, as being of high cost and inconvenient to use, the ultrasonic detector fails to be universalized.

On the other hand, in order to obtain a precise measurement result, the fastener with built-in computing devices, such as built-in sensor, data transmitter and microprocessor, is utilized in some available torque measurement devices, which significantly increases the manufacturing cost of the fastener. Furthermore, another way to increase the precision of the measurement result is to connect the load cell with the measurement device electrically by wire and then place the fastener on the load cell to perform tightening operation, such that the measurement device can display the locking force through the load cell. However, the load cell electrically connected to the measurement device by wire will retard the measurement operation.

Accordingly, conventional methods for measuring the tightening torque and the locking force have problems that the measurement result is not accurate enough. The measurement is of high cost and not convenient to users.

SUMMARY OF THE INVENTION

In view of the aforementioned problems of the prior art, the present invention provides the apparatus and the method capable of controlling, tracking and measuring the tightening torque and the locking force, which are applicable to measure and control the tightening torque or the locking force applied to a fastener in order to prevent from excessive or insufficient locking force or tightening torque applied to the fastener. Meanwhile, the locking force and the tightening torque applied to the fasteners can be measured and tracked continuously to prevent from the accidents caused by the damaged or loosened fasteners.

It is one of the objects of the present invention to provide an apparatus capable of controlling, tracking and measuring the tightening torque and the locking force, which comprises a sensing device. The sensing device is applicable to sense the locking force or the tightening torque applied on the fastener. The sensing device comprises a first connector, a sensor and an identifier. The first connector is disposed on the head of the sensing device. The sensor is electrically connected to the first connector and senses the locking force or the tightening torque applied to the sensing device in order to output sensing data to the first connector. The identifier is electrically connected to the first connector and has a device identification code. The device identification code comprises at least one device serial number, a device material serial number or the maximum locking force of this device.

It is another object of the present invention to provide an apparatus capable of controlling, tracking and measuring the tightening torque and the locking force, which comprises a transducing device. The transducing device is connected to a sensing device of the apparatus capable of controlling, tracking and measuring the locking force and the tightening torque, and is applicable to receive and transmit sensing data or a device identification code to a control device. The transducing device further comprises a second connector, an amplifying circuit, a first microprocessor, a first signal transmitter and a first power supply. The second connector is disposed on one end of the transducing device, which receives and outputs the sensing data and the device identification code. The amplifying circuit is electrically connected to the second connector, which receives and amplifies the sensing data. The first microprocessor is electrically coupled to the amplifying circuit and comprises a signal convertor. The signal convertor receives the amplified sensing data and converts the amplified sensing data from the analog signal to the digital signal to form a real-time sensing value. The first signal transmitter can be a wire or wireless communication device, and electrically connected to the first microprocessor to receive the real-time sensing value or the device identification code. The first power supply is electrically connected to the second connector, the amplifying circuit, the first microprocessor and the first signal transmitter to provide a first working voltage.

Wherein, the appearance and the size of one end of the transducing device are respectively correspondent with the appearance and the size of one end of the sensing device to be coupled.

It is still another object of the present invention to provide an apparatus capable of controlling, tracking and measuring the tightening torque and the locking force, which comprises a control device. The control device communicates with a transducing device of the apparatus capable of controlling, tracking and measuring the locking force and the tightening torque. The control device receives a real-time sensing value or a device identification code via the transducing device so as to measure and control the locking force or the tightening torque applied to a sensing device of the apparatus capable of controlling, tracking and measuring the locking force and the tightening torque by the tightening tool, or track and measure the locking force or the tightening torque applied to the sensing device. The control device comprises a second signal transmitter, a second microprocessor, a plurality of buttons, a warning device, a displaying device, a second power supply, a power source, a power regulator, a pressure sensor and a control valve. The second signal transmitter is a wire or wireless communication device, and communicates with a first signal transmitter of the transducing device in order to receive and transmit the real-time sensing value or the device identification code to the second microprocessor. The plurality of buttons is utilized to input a setting value to the second microprocessor or choose an operation mode of the control device. The second microprocessor receives the real-time sensing value or the device identification code, and comparing the setting value with the real-time sensing value.

The warning device is electrically connected to the second microprocessor, and respectively outputs a first warning signal, a second warning signal or a third warning signal according to the first measurement result, the second measurement result or the third measurement result. The displaying device is electrically connected to the second microprocessor and the warning device to display the device identification code, the first measurement result, the second measurement result, the third measurement result, the first warning signal, the second warning signal or the third warning signal.

The power source provides a power to the tightening tool and the power further comprises electrical power, pneumatic power, or hydraulic power. The power regulator is selectively connected to the output of the power source. When the power source is the pneumatic power, the power regulator can be a pneumatic regulating valve to adjust the pneumatic pressure outputted by the power source. When the power source is the hydraulic power source, the power regulator can be a hydraulic regulating valve in order to regulate the hydraulic pressure outputted by the power source. The pressure sensor is connected to the second microprocessor, the second power supply and the power regulator. When the power source is the pneumatic power source or hydraulic power source, the pressure sensor will detect the magnitude of the pneumatic power or the hydraulic power adjusted by the power regulator. The control valve is connected to the second microprocessor, the pressure sensor and the second power supply. When the second microprocessor outputs the second measurement result or the third measurement result, the control valve will block the power outputted by the power source.

Wherein, when the real-time sensing value is lower than the admissible range of the setting value, the second microprocessor outputs the first measurement result; when the real-time sensing value is equal to the admissible range of the setting value, the second microprocessor outputs the second measurement result; and when the real-time sensing value is higher than the admissible range of the setting value, the second microprocessor outputs the third measurement result.

It is still another object of the present invention to provide an apparatus capable of controlling, tracking and measuring the tightening torque and the locking force, which comprises a sensing device, a transducing device and a control device. The sensing device comprises a first connector, a sensor, and an identifier. The first connector is disposed on the head of the sensing device. The sensor is electrically connected to the first connector and senses the tightening torque or the locking force to output sensing data to the first connector. The identifier is electrically connected to the first connector and has a device identification code. The device identification code comprises at least one device serial number, a device material serial number or the maximum locking force of this device.

The transducing device is connected to the sensing device and applicable to receive and transmit the sensing data or the device identification code from the sensing device to the control device. The transducing device further comprises a second connector, an amplifying circuit, a first microprocessor, a first signal transmitter and a first power supply. The second connector is disposed on one end of the transducing device to receive and transmit the sensing data and the device identification code. The amplifying circuit is electrically connected to the second connector to receive and amplify the sensing data. The first microprocessor is electrically connected to the amplifying circuit and comprises a signal convertor. The signal convertor receives the amplified sensing data and converts the amplified sensing data from the analog signal to the digital signal in order to form a real-time sensing value. The first signal transmitter can be a wire or wireless communication device, and is electrically connected to the first microprocessor to receive and transmit the real-time sensing value or the device identification code. The first power supply is electrically connected to the second connector, the amplified circuit, the first microprocessor and the first signal transmitter to provide a first working voltage.

The control device communicates with the transducing device and receives the real-time sensing value and the device identification code via the transducing device in order to measure and control the locking force or the tightening torque applied to the sensing device by the tightening tool, or track and measure the locking force or the tightening torque applied to the sensing device. The control device comprises a second signal transmitter, a second microprocessor, a plurality of buttons, a warning device, a displaying device, a second power supply, a power source, a power regulator, a pressure sensor and a control valve. The second signal transmitter is a wire or wireless communication device, and communicates with the first signal transmitter of the transducing device in order to receive and transmit the real-time sensing value or the device identification code to the second microprocessor. A plurality of buttons can be utilized to input a setting value to the second microprocessor or choose an operation mode of the control device. The second microprocessor receives the real-time sensing value or the device identification code, and compares the setting value with the real-time sensing value.

The warning device is electrically connected to the second microprocessor, and respectively outputs a first warning signal, a second warning signal or a third warning signal according to the first measurement result, the second measurement result or the third measurement result. The displaying device is electrically connected to the second microprocessor and the warning device to display the device identification code, the first measurement result, the second measurement result, the third measurement result, the first warning signal, the second warning signal or the third warning signal.

The power source 46 provides the dynamic-driven tightening tool 5 with power, which comprises electrical power source, pneumatic power source, or hydraulic power source. The power regulator can be selectively connected to the output of the power source. When the power source is the pneumatic power source, the power regulator can be a pneumatic regulating valve in order to regulate the pneumatic pressure outputted by the power source. When the power source is the hydraulic power source, the power regulator can be a hydraulic regulating valve in order to regulate the hydraulic pressure outputted by the power source. The pressure sensor is connected to the second microprocessor, the second power supply and the power regulator. When the power source is the pneumatic power source, or hydraulic power source, the pressure sensor will detect the magnitude of the pneumatic pressure or the hydraulic pressure adjusted by the power regulator. The control valve is connected to the second microprocessor, the pressure sensor 48 and the second power supply. When the second microprocessor outputs the second measurement result or the third measurement result, the control valve will block the power outputted by the power source.

wherein, when the real-time sensing value is lower than the admissible range of the setting value, the second microprocessor outputs a first measurement result; when the real-time sensing value is equal to the admissible range of the setting value, the second microprocessor outputs a second measurement result; and when the real-time sensing value is higher than the admissible range of the setting value, the second microprocessor outputs a third measurement result.

Besides, the present invention further comprises a control method for the apparatus capable of controlling, tracking and measuring the tightening torque and the locking force, which is applicable to utilize the apparatus capable of controlling, tracking and measuring the tightening torque and the locking force to control the tightening torque and the locking force applied to a fastener by a tightening tool. The apparatus capable of controlling, tracking and measuring the tightening torque and the locking force comprises a sensing device, a transducing device and a control device The control method comprises the following steps of: connecting a first signal transmitter of the transducing device to a second signal transmitter of the control device so as to allow the control device to communicate with the transducing device; choosing an operation mode by the plurality of buttons of the control device in order to control the control device to perform the tightening operation or the measurement operation; engaging the first connector of the sensing device with the second connector of the transducing device in order to electrically connect the sensing device to the transducing device; reading out a device identification code of the sensing device and displaying the device identification code on the displaying device of the control device; transmitting sensing data to the transducing device via the first connector and the second connector; receiving and amplifying the sensing data by the amplifying circuit of the transducing device; receiving the amplified sensing data and converting the amplified data from the analog signal to the digital signal by the first microprocessor of the transducing device in order to form a real-time sensing value; transmitting the real-time sensing value from the transducing device to the control device via the first signal transmitter and the second signal transmitter; inputting a setting value; placing the socket of the tightening tool on the transducing device to rotate the sensing device; comparing the real-time sensing value with the setting value by the second microprocessor of the control device; outputting a first measurement result by the second microprocessor and outputting the first warning signal by the warning device of the control device when the real-time sensing value is lower than the admissible range of the setting value; outputting a second measurement result by the second microprocessor and outputting a second warning signal by the warning device when the real-time sensing value is equal to the admissible range of the setting value; outputting a third measurement result by the second microprocessor and outputting a third warning signal by the warning device when the real-time sensing value is higher than the admissible range of the setting value; displaying the first measurement result, the second measurement result, the third measurement result, the first warning signal, the second warning signal or the third warning signal on the displaying device.

The control method further comprises the following steps of: receiving the second measurement result or the third measurement result by the control valve of the control device when the tightening tool is a dynamic-driven tightening tool; and blocking the driving power of the dynamic-driven tightening tool by the control valve.

Furthermore, the present invention further provides a calibration method for the apparatus capable of controlling, tracking and measuring the tightening torque and the locking force. The calibration method performs the calibration operation on the sensing device of the apparatus capable of controlling, tracking and measuring the tightening torque and the locking force by a standard torque transducer, a standard load cell and a calibration fixture. The apparatus capable of controlling, tracking and measuring the tightening torque and the locking force further comprises a transducing device and a control device. The calibration method comprises the following steps of: engaging the first connector of the sensing device with the second connector of the transducing device to electrically connect the sensing device and the transducing device; connecting the first signal transmitter of the transducing device to the second signal transmitter of the control device by a wire or wireless transmitting device to allow the transducing device to communicate with the control device; transmitting a device identification code to the control device via the transducing device and displaying the device identification code on the displaying device of the control device; inserting the sensing device into the standard load cell to screw into the calibration fixture; electrically connecting the sensing device and the standard load cell to the control device; coupling a tightening tool with the standard torque transducer and the transducing device to apply a tightening torque to the sensing device while screwing the sensing device and the standard load cell into the calibration fixture; receiving measurement data about the tightening torque of the standard torque transducer, a real-time sensing value of the sensing device and the measurement data about the locking force of the standard load cell by the second microprocessor of the control device; comparing and calculating the measurement data about the tightening torque of the standard torque transducer, the real-time sensing value of the sensing device and the measurement data about the locking force of the standard load cell in order to obtain the linear-relation equation of the real-time sensing value of the sensing device, the measurement data of the locking force of the standard load cell and the measurement data of the tightening torque of the standard torque transducer; and recording and saving the linear-relation equation and the device identification code in the second microprocessor or an independent memory device.

In summation of the description above, the apparatus and method capable of controlling, tracking and measuring the tightening torque and the locking force in accordance with the present invention have the following advantages:

(1) The sensing device can respectively provide a linear-relation equation of the sensing data, corresponding tightening torque and locking force thereof by the aforementioned method in order to manufacture a high-precision sensing device and enhance the precision of the sensing result.

(2) The sensing device comprises the identifier, which can not only provide the device serial number and the device material serial number of the fastener, but also the type of calibration fixture when performing calibration operation and other necessary data in order to continuously track and provide technical information for choosing the appropriate sensing device.

(3) The control device comprises the warning device, which can switch off the power source and sending a warning signal in time in order to prevent from damages on the structure of the fastener due to excessive force applied to the tightening tool when the tightening torque or the locking force of the transducing device placed on the fastener with the sensing device according to the present invention is close to or has reached the admissible maximum tightening torque or locking force thereof.

(4) The sensing device and the transducing device can be designed with different sizes and shapes according to various requirements in order to extend the range of application of the system capable of controlling, tracking and measuring the tightening torque and the locking force in accordance with the present invention.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become clear by the detailed description of the following embodiments and the illustration of related drawings as follows.

Figure 1:
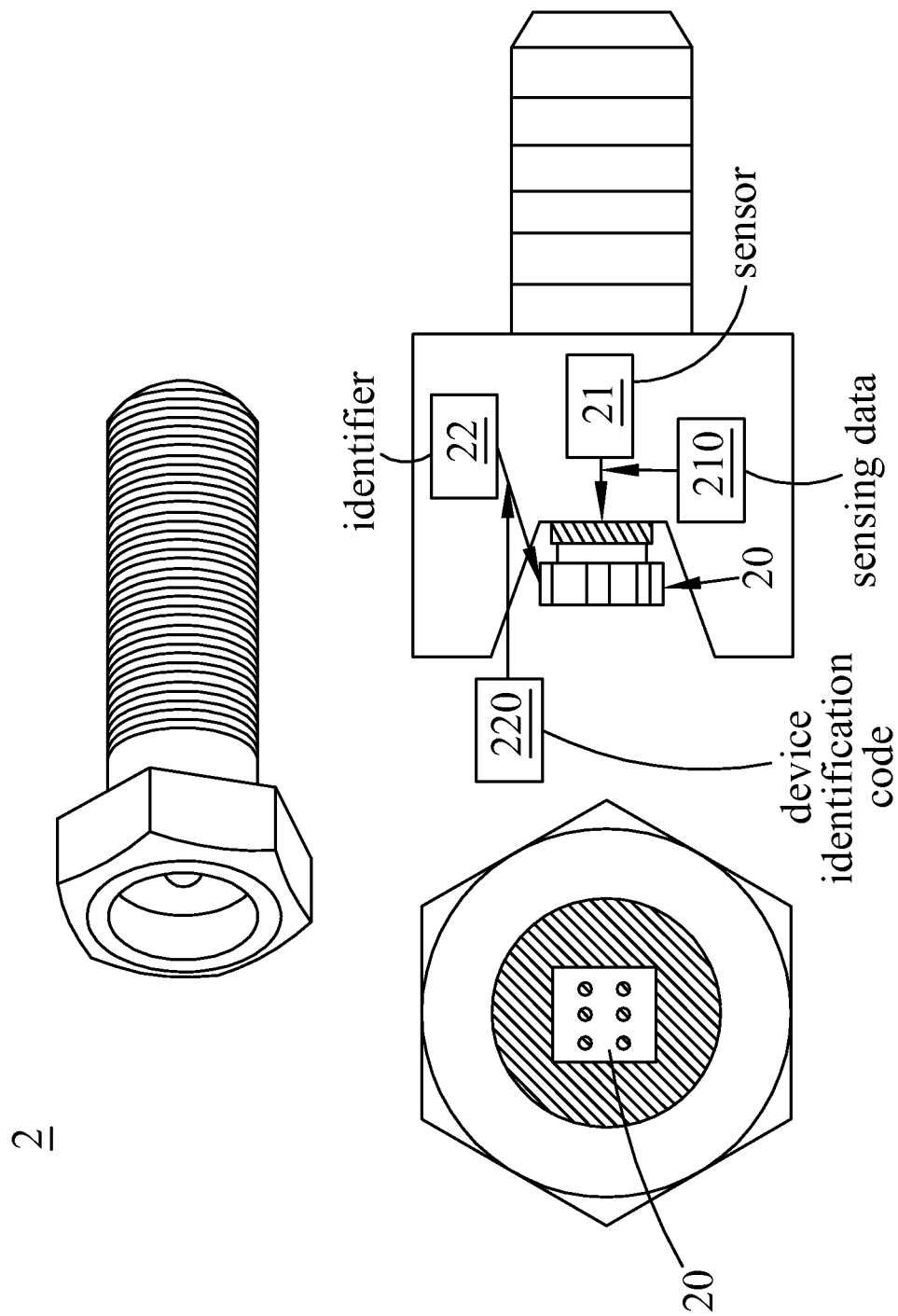
FIG. 1 is the schematic view of the first preferred embodiment of the sensing device of the apparatus capable of controlling, tracking and measuring the tightening torque and the locking force in accordance with the present invention.
Figure 2:
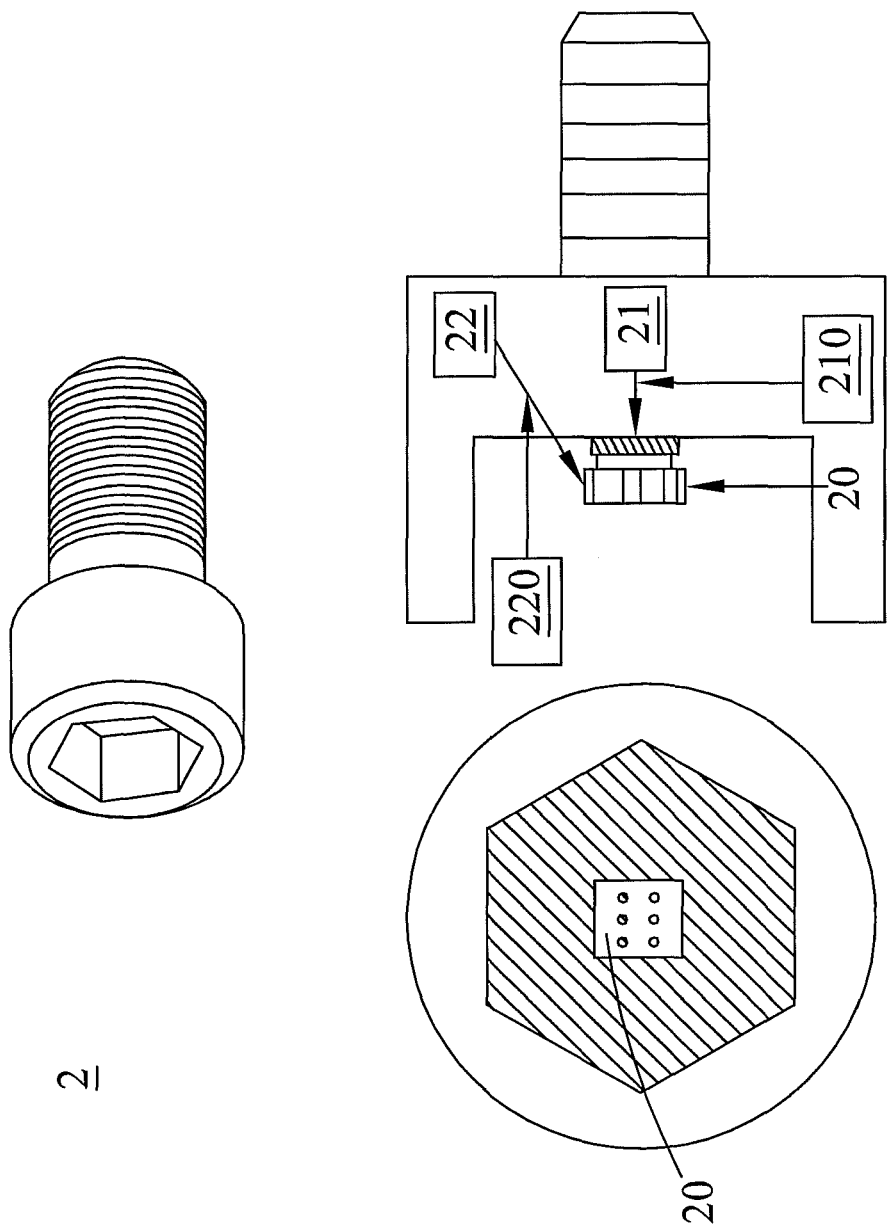
FIG. 2 is the schematic view of the second preferred embodiment of the sensing device of the apparatus capable of controlling, tracking and measuring the tightening torque and the locking force in accordance with the present invention.

Please refer to FIG. 1 and FIG. 2. FIG. 1 is the schematic view of the first preferred embodiment of the sensing device of the apparatus capable of controlling, tracking and measuring the tightening torque and the locking force in accordance with the present invention. FIG. 2 is the schematic view of the second preferred embodiment of the sensing device of the apparatus capable of controlling, tracking and measuring the tightening torque and the locking force in accordance with the present invention. As shown in FIGS, the sensing device 2 is the main body of the fastener, which may be a hexagonal head bolt or socket head bolt and can sensing the tightening torque or the locking force applied to the fastener when the tightening operation is performed by a tightening tool. The sensing device 2 can be designed with different sizes and shapes according to the various requirements.

The sensing device 2 includes a first connector 20, a sensor 21 and an identifier 22. The sensor 21 can be any high-sensitivity sensing element capable of sensing the deformation of the main body of the sensing device 2 caused by the applied force and stably keeping the deformation variation thereof for a long time even if the applied force is removed. In the embodiment, the sensor 21 can be a strain gauge, which is utilized for sensing the tightening torque and the locking force applied to the sensing device 2. According to the deformation of main body of the sensing device 2, the strain gauge senses a deformation variation and the sensing device 21 outputs a sensing data 210. The identifier 22 includes a device identification code 220, which is utilized to record the device serial number, device material number, the correspondent locking force, the tightening torque and so on. The identifier 22 may be an identity (ID) element or radio frequency identification (RFID) element, and electrically connected to the first connector 20.

Besides, the first connector 20 may be disposed on the head of the sensing device 2 and electrically connected to the sensor 21 and the identifier 22 in order to receive and transmit the sensing data 210 or the device identification code 220. The sensor 21 is disposed at the most appropriate position according to its characterization thereof.

In the embodiment, sensing device 2 may package all components thereof by potting encapsulation to absorb vibration by the flexibility of the glue in order to prevent each component from being damaged or dropping off due to the stress caused by shaking or vibrating the sensing device 2 when the tightening tool is used to perform the tightening operation.

Figure 3:
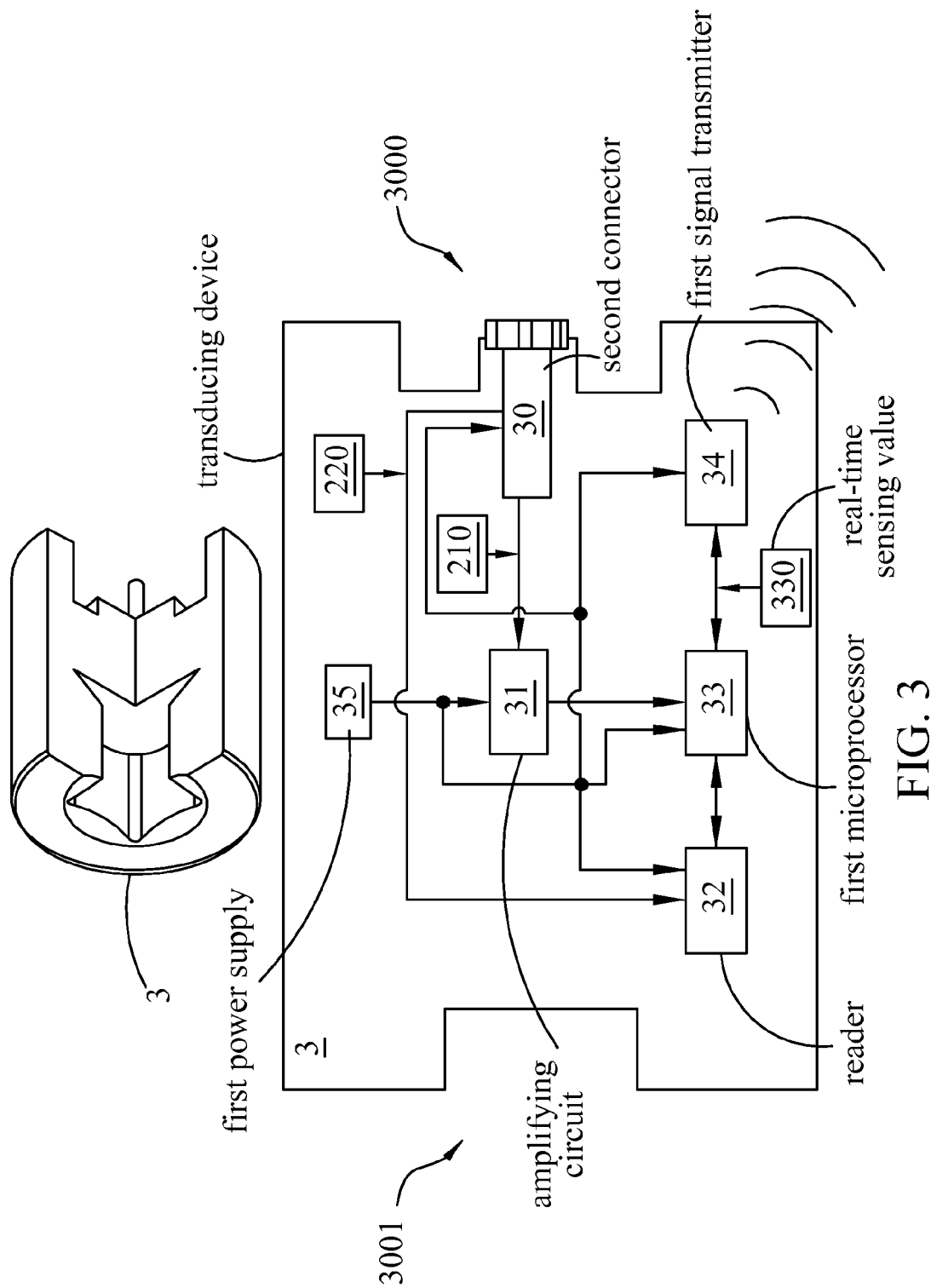
FIG. 3 is the schematic view of the first preferred embodiment of the transducing device of the apparatus capable of controlling, tracking and measuring the tightening torque and the locking force in accordance with the present invention.
Figure 4:
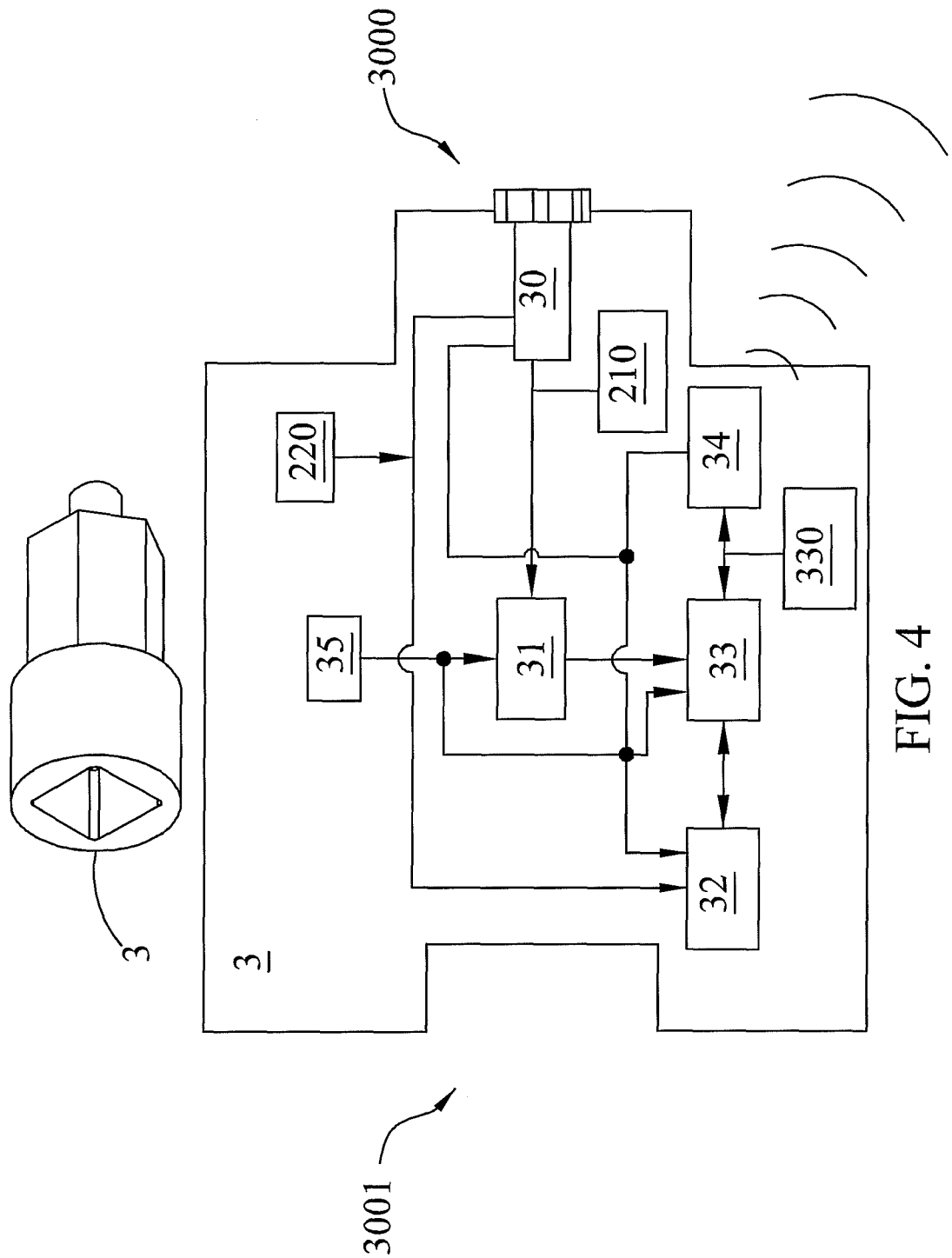
FIG. 4 is the schematic view of the second preferred embodiment of the transducing device of the apparatus capable of controlling, tracking and measuring the tightening torque and the locking force in accordance with the present invention.

Please refer to FIG. 1, FIG. 2, FIG. 3 and FIG. 4. FIG. 3 is the schematic view of the first preferred embodiment of the transducing device of the apparatus capable of controlling, tracking and measuring the tightening torque and the locking force in accordance with the present invention. FIG. 4 is the schematic view of the second preferred embodiment of the transducing device of the apparatus capable of controlling, tracking and measuring the tightening torque and the locking force in accordance with the present invention. As shown in FIGS, one end 3000 of the transducing device 3 may be connected to the aforementioned sensing device 2 of the apparatus capable of controlling, tracking and measuring the tightening torque and the locking force, which can receive and transmit the sensing data 210 and the device identification code 220 of the sensing device 2. The other end 3001 of the transducing device 3 can be connected to a tightening tool, which can convey the torque that the tightening tool outputs to the sensing device 2. Thus, the transducing device 3 may have different shapes, sizes and materials according to the shapes, sizes and materials of the sensing device 2 and the tightening tool in order to meet the actual requirements. For examples, when the sensing device 2 is a hexagon head bolt, the transducing device 3 can be a socket form, which means that one end 3000 of the transducing device 3 can be a concave structure, as shown in FIG. 3. Similarly, when the sensing device 2 is a socket head bolt, the transducing device 3 may be a driving head, which means that one end 3000 of the transducing device 3 may be a convex structure, as shown in FIG. 4.

The transducing device 3 comprises a second connector 30, an amplifying circuit 31, a reader, a first microprocessor 33, a first signal transmitter 34 and a first power supply 35. The first power supply 35 may be a common battery or rechargeable battery, which respectively provides a first working voltage to the second connector 30, the amplifying circuit 31, the first microprocessor 33 and the first signal transmitter 34. The second connector 30 is disposed on one end 3000 of the transducing device 3, which connects the sensing device 2 to provide voltage and actuate the sensing device 2, and receive the sensing data 210 or the device identification code 220. The amplifying circuit 31 is electrically connected to the second connector 30 and the first microprocessor 33 to receive and amplify the sensing data 210 in order to have it transmitted to the first microprocessor 33. The reader 32 is electrically connected to the second connector 30 and the first microprocessor 33. The first microprocessor 33 includes a signal convertor, which may be an external device connected to the first microprocessor 33 or a built-in device inside the first microprocessor 33. When receiving the amplified sensing data 210, the first microprocessor 33 converts the amplified sensing data 210 from the analog signal to the digital signal so as to form a real-time sensing value 330. The first signal transmitter 34 is electrically connected to the first microprocessor 33, which can be a wire or wireless communication device to receive and transmit the real-time sensing value 330 and the device identification code 220 to the control device.

In the embodiment, transducing device 3 may package all components thereof by potting encapsulation to absorb vibration by the flexibility of the glue in order to prevent each component from being damaged or dropping off due to the stress caused by shaking or vibrating the transducing device 3 when the tightening tool is used to perform the tightening operation.

Figure 5:
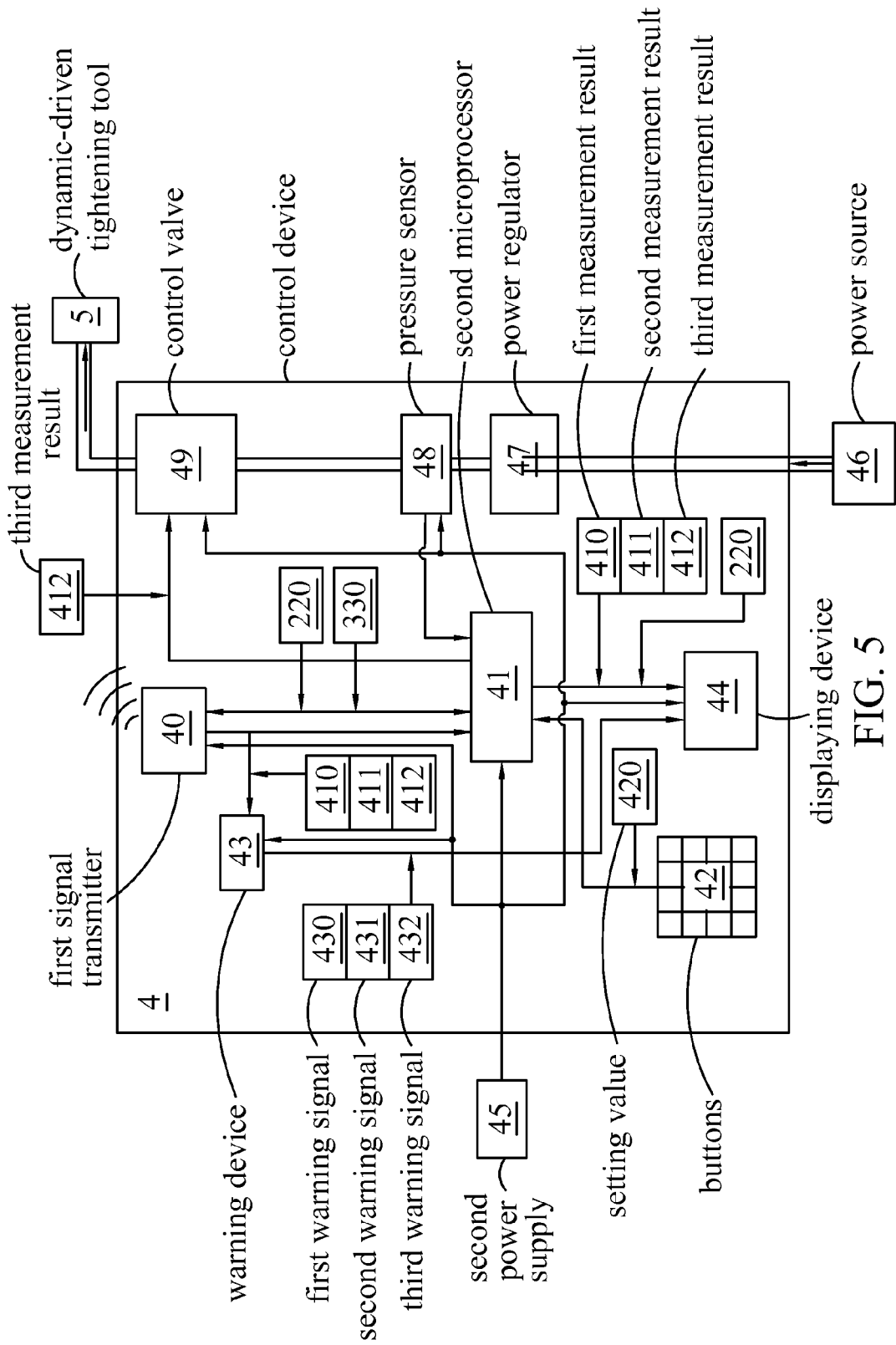
FIG. 5 is the schematic view of the first preferred embodiment of the control device of the apparatus capable of controlling, tracking and measuring the tightening torque and the locking force in accordance with the present invention.

Please refer to FIG. 5. FIG. 5 is the schematic view of the first preferred embodiment of the control device of the apparatus capable of controlling, tracking and measuring the tightening torque and the locking force in accordance with the present invention. Please also refer to FIG. 1 and FIG. 3. As shown in FIGS, the control device 4 may be disposed in the dynamic-driven tightening tool 5, or in an externally independent control box, which can control the dynamic-driven tightening tool 5 or a manual-driven tightening tool to perform tightening operation, or track and measure the tightening torque and the locking force applied to the sensing device of the apparatus capable of controlling, tracking and measuring the tightening torque and the locking force. The control device 4 can be disposed at different positions in the dynamic-driven tightening tool 5, for example, inside the handle of the dynamic-driven tightening tool 5. The control device 4 may communicate with the transducing device 3 of the apparatus capable of controlling, tracking and measuring the tightening torque and the locking force, and receives the real-time sensing value 330 or the device identification code 20 via the transducing device 3 by wire or wireless communication device.

The control device 4 comprises the first signal transmitter 40, the second microprocessor 41, the plurality of buttons 42, the warning device 43, the displaying device 44 and the second power supply 45. The second power supply 45 may be a built-in or portable power supply. The second power supply 45 is electrically connected to the second signal transmitter 40, the second microprocessor 41, the buttons 42, the warning device 43 and the displaying device 44 so as to respectively provide a second working voltage. The second signal transmitter 40 can be a wire or wireless communication device, which can communicate with the transducing device 3 in order to receive the real-time sensing value 330 or the device identification code 220. The operation mode of the control device 4 can be chosen via the buttons 42, for example, tightening operation mode or track and measurement operation mode. Besides, the setting value 420 can also be inputted via the buttons 42, for example, a setting parameter for setting the maximum tightening torque or the admissible torque and locking force range to be applied to the sensing device.

In addition, the second microprocessor 41 is electrically connected to the second signal transmitter 40, the warning device 43 and the displaying device 44. The second microprocessor 41 receives the real-time sensing value 330 or the device identification code 220, and compares the real-time sensing value 330 with the setting value 420. When the real-time sensing value 330 is lower than the admissible range of the setting value 420, the second microprocessor 41 outputs the first measurement result 410 and the warning device 43 outputs the first warning signal 430 according to the first measurement result 410. When the real-time sensing value 330 is equal to the admissible range of the setting value 420, the second microprocessor 41 outputs the second measurement result 411, and the warning device 43 outputs the second warning signal 431. When the real-time sensing value 330 is higher than the admissible range of the setting value 420, the second microprocessor 41 outputs the third measurement result 412 and the warning device 43 outputs the third warning signal 432 according to the third measurement result 412. Meanwhile, the displaying device 44 displays the device identification code 220, the first measurement result 410, the second measurement result 411 or the third measurement result 412 outputted by the second microprocessor 41 in real time. The displaying device 44 can also display the first warning signal 430, the second warning signal 431 or the third warning signal 432.

Besides, the control device 4 further comprises the power source 46, the power regulator 47, the pressure sensor 48 and the control valve 49. When the tightening tool is a dynamic-driven tightening tool 5, the power source 46 provides the dynamic-driven tightening tool 5 with power to perform tightening operation, which can be an electrical power source, pneumatic power source, or hydraulic power source. The power regulator 47 can be selectively connected to the output of the power source 46. When the power source 46 of the dynamic-driven tightening tool 5 is a pneumatic power source, the power regulator 47 can be a pneumatic regulating valve in order to regulate the pneumatic pressure outputted by the power source 46. When the power source 46 of the dynamic-driven tightening tool 5 is a hydraulic power source, the power regulator 47 can be an hydraulic regulating valve (not shown) in order to regulate the hydraulic pressure outputted by the power source 46. The pressure sensor 48 is connected to the second microprocessor 41, the second power supply 45 and the power regulator 47. When the power source 46 is the pneumatic power source, or hydraulic power source, the pressure sensor 48 will detect the magnitude of the pneumatic pressure or the hydraulic pressure adjusted by the power regulator 47. The control valve 49 is connected to the second microprocessor 41, the pressure sensor 48 and the second power supply 45. When the second microprocessor 41 outputs the second measurement result 411 or the third measurement result 412, the control valve 49 will block the driving power of the dynamic-driven tightening tool 5 to switch off the dynamic-driven tightening tool 5.

It is worthy to point out that the power source 46, the power regulator 47, the pressure sensor 48 and the control valve 49 can be idle when the control device 4 is disposed in the externally independent control box, or used in a manual-driven tightening tool. In addition, when the control device 4 is used to perform the tracking and measuring operation, the power source 46, the power regulator conditioner 47, the pressure sensor 48 and the control valve 49 can also be idle.

In the embodiment, when the power source 46 is a pneumatic or hydraulic power source 46, the control valve 49 can be a solenoid valve. When the power source 46 is a electrical power source 46, the control valve 49 then can be a relay.

Besides, the first warning signal 430, the second warning signal 431 and the third warning signal 432 can utilize different lights, sounds or the combination thereof to act as warning signal in order to discriminate among different measurement results. For example, the first warning signal 430 can be a green light to alert the user that the tightening torque applied to the sensing device does not reach the preset locking force or tightening torque, and the tightening operation can keep going. The second warning signal 431 can be a yellow light to alert the user that the tightening torque applied on the sensing device has reached the preset locking force or tightening torque. Meanwhile, if the control device 4 is disposed in the dynamic-driven tightening tool 5, the control valve 49 will shut down the dynamic-driven tightening tool 5. The third warning signal 432 can be a red light together with a warning buzz to alert the user that the tightening torque applied to the sensing device has exceeded the preset locking force or tightening torque. Meanwhile, if the control device 4 is disposed in the dynamic-driven tightening tool 5, the dynamic-driven tightening tool 5 will be stopped.

Figure 6:
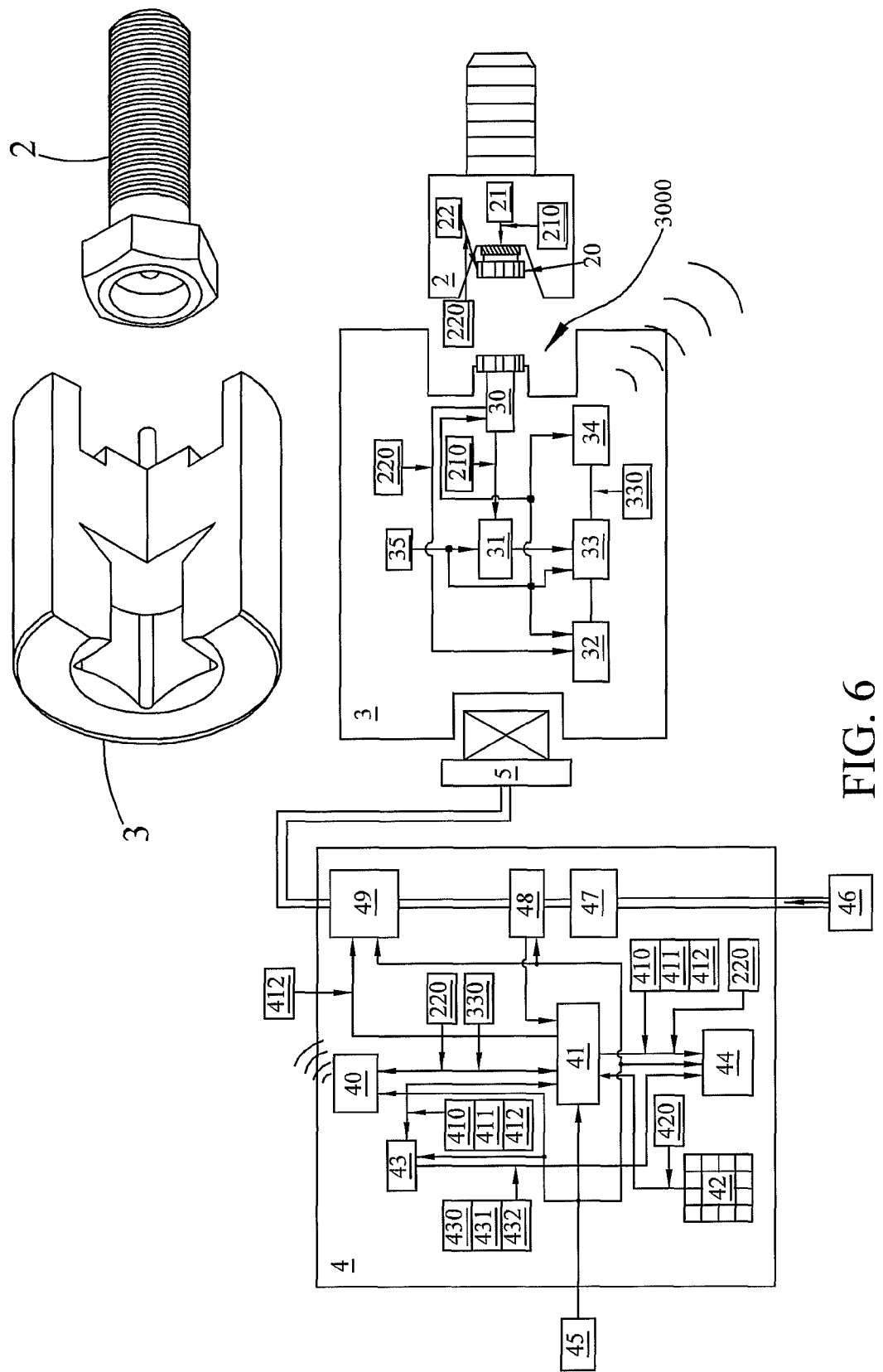
FIG. 6 is the schematic view of the first preferred embodiment of the apparatus capable of controlling, tracking and measuring the tightening torque and the locking force in accordance with the present invention.

With reference to FIG. 6 for the schematic view of the first preferred embodiment of the apparatus capable of controlling, tracking and measuring the tightening torque and the locking force in accordance with the present invention. Please also refer to FIG. 3. As shown in FIGS, the apparatus capable of controlling, tracking and measuring the tightening torque and the locking force comprises a sensing device 2 as the aforementioned, a transducing device as the aforementioned and the control device 4 as the aforementioned. In the embodiment, the sensing device 2 can be a hexagon head bolt, so the transducing device 3 can be a socket form, which means one end 3000 of the transducing device 3 (concave end) can be electrically coupled to the sensing device 2 by engaging the second connector 30 with the first connector 20 in order to provide voltage to actuate the sensing device 2. Meanwhile, the transducing device 3 receives the sensing data 210 and the device identification code 220 outputted by the sensing device 2. Besides, the other end 3001 of the transducing device 3 can be coupled to the dynamic-driven tightening tool 5. The control device 4 can also be disposed in the dynamic-driven tightening tool 5 and communicate with the first signal transmitter 34 of the transducing device 3 via the second signal transmitter 40.

When the apparatus capable of controlling, tracking and measuring the tightening torque and the locking force in accordance with the present invention is powered up, the sensing device 2 will transmit the device identification code 220 to the control device 4 via the transducing device 3 and display which on the displaying device 44. Next, the operation mode of the control device 4 can be selected via the buttons 42 to control the control device 4 to perform the tightening operation. In addition, a setting value can be inputted via the buttons 42 to set the maximum locking force and tightening torque of the sensing device 2. When the dynamic-driven tightening tool 5 applies tightening toque or locking force on the sensing device 2 through the transducing device 3, the sensing device 2 will transmit the sensing data 210 to the transducing device 3. The amplifying circuit 31 of the transducing device 3 receives and amplifies the sensing data 210. The first microprocessor 33 receives the amplified sensing data 210 and converts which from the analog signal to the digital signal to form the real-time sensing value 330. The real-time sensing value 330 can be transmitted to the control device 4 via the first signal transmitter 34 and the second signal transmitter 40, such as Bluetooth, Wireless Fidelity (Wi-Fi) device or other wireless transmission device.

The second microprocessor 41 of the control device 4 will compare the setting value 420 with the real-time sensing value 330 in order to respectively output the first measurement result 410, the second measurement result 411 or the third measurement result 412. The warning device 43 can respectively output the first warning signal 430, the second warning signal 431 and the third warning signal 432 according to the measurement result. The displaying device 44 can display the first measurement result 410, the second measurement result 411 or the third measurement result 412 in real time.

In addition, on receiving the second measurement result 411 or the third measurement result 412, the control valve 49 of the control device 4 will block the driving power of the dynamic-driven tightening tool 5 to stop the tightening operation.

When the control device 4 is selected to perform tracking and measuring operation and the transducing device 3 is connected to the sensing device 2, and the real-time sensing data 330 and the device identification code 220 will be feedback to the control device 4 via the transducing device 3 so as to display the locking force and the tightening torque on the displaying device 44 in real time.

It's worthy to point out that, by reading out the device identification code 220, the control device will not only monitor the locking force and the tightening torque applied to the sensing device 2, but also record and track which in order to collect the data about the locking force and the tightening torque applied to the sensing device 2 and so on.

The detailed description and implementation method of the apparatus capable of controlling, tracking and measuring the locking force and the tightening torque in accordance with the present invention have been described in the section of the sensing device, transducing device and the control device of the apparatus capable of controlling, tracking and measuring the locking force and the tightening torque in accordance with the present invention already, and thus will not be repeated.

Figure 7:
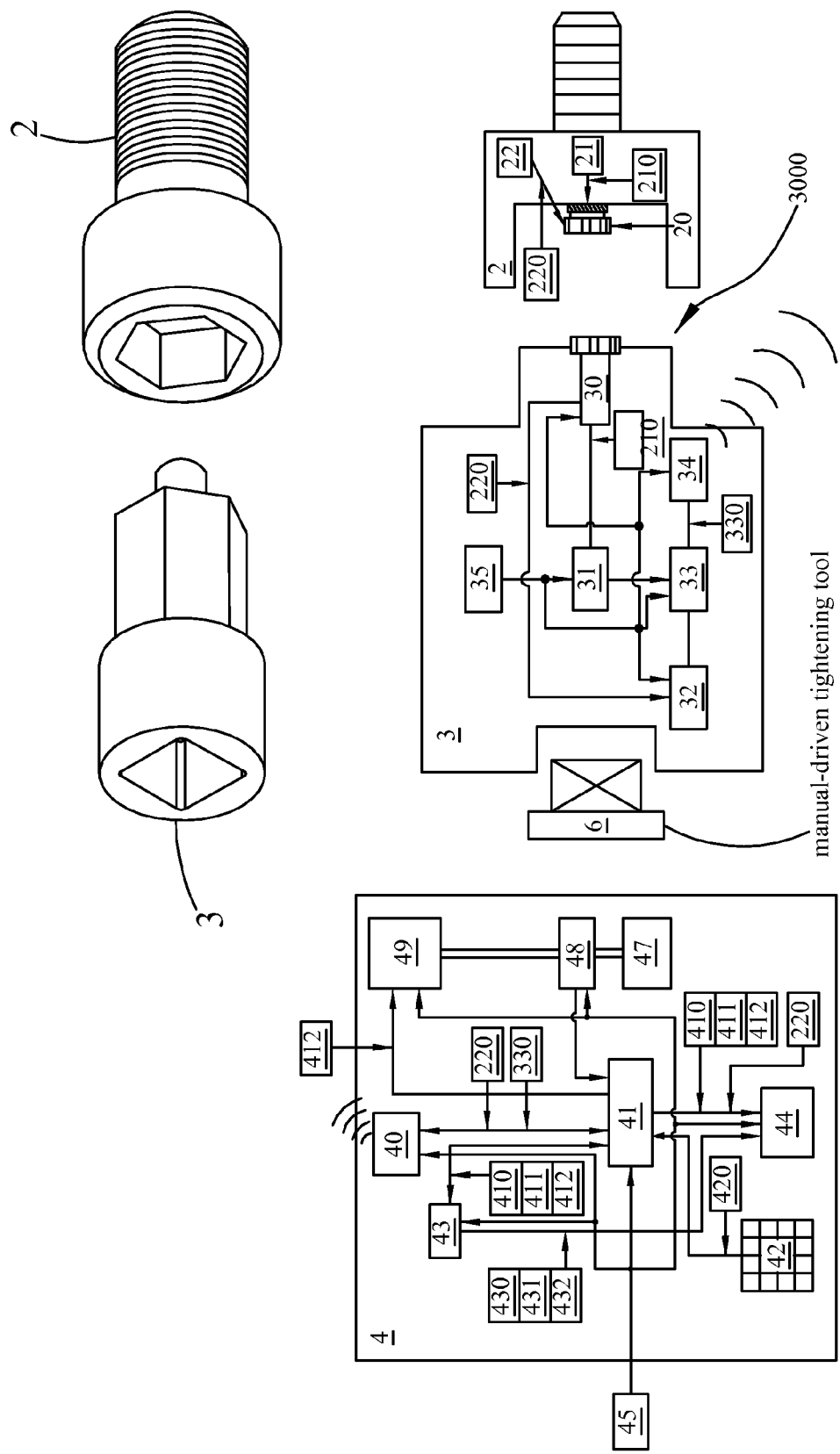
FIG. 7 is the schematic view of the second preferred embodiment of the apparatus capable of controlling, tracking and measuring the tightening torque and the locking force in accordance with the present invention.

In summation of the description above, please refer to FIG. 7, which is the schematic view of the second preferred embodiment of the apparatus capable of controlling, tracking and measuring the tightening torque and the locking force in accordance with the present invention. Please also refer to FIG. 4. As shown in FIGS, the control device 4 can be disposed in the externally independent control box so as to measure and control the tightening operation of the manual-driven tightening tool 6, or track and measure the locking force and the tightening torque applied to the aforementioned sensing device 2. Meanwhile, the power source 46, the power regulator 47, the pressure sensor 48 and the control valve 49 can be idle. In the embodiment, the sensing device 2 can be a socket head bolt, so the transducing device 3 can be a driving head, which means one end 3000 (convex end) of the transducing device 3 can be electrically coupled to the sensing device 2 by engaging the first connector 20 with the second connector 30. In addition, the other end 3001 of the transducing device 3 can be connected to the manual-driven tightening tool 6. The control device 4 can communicate with transducing device 3 via the second signal transmitter 40 and the first signal transmitter 34. Accordingly, the control device 4 can perform the tightening operation, or the tracking and measuring operation as the description above.

Figure 8:
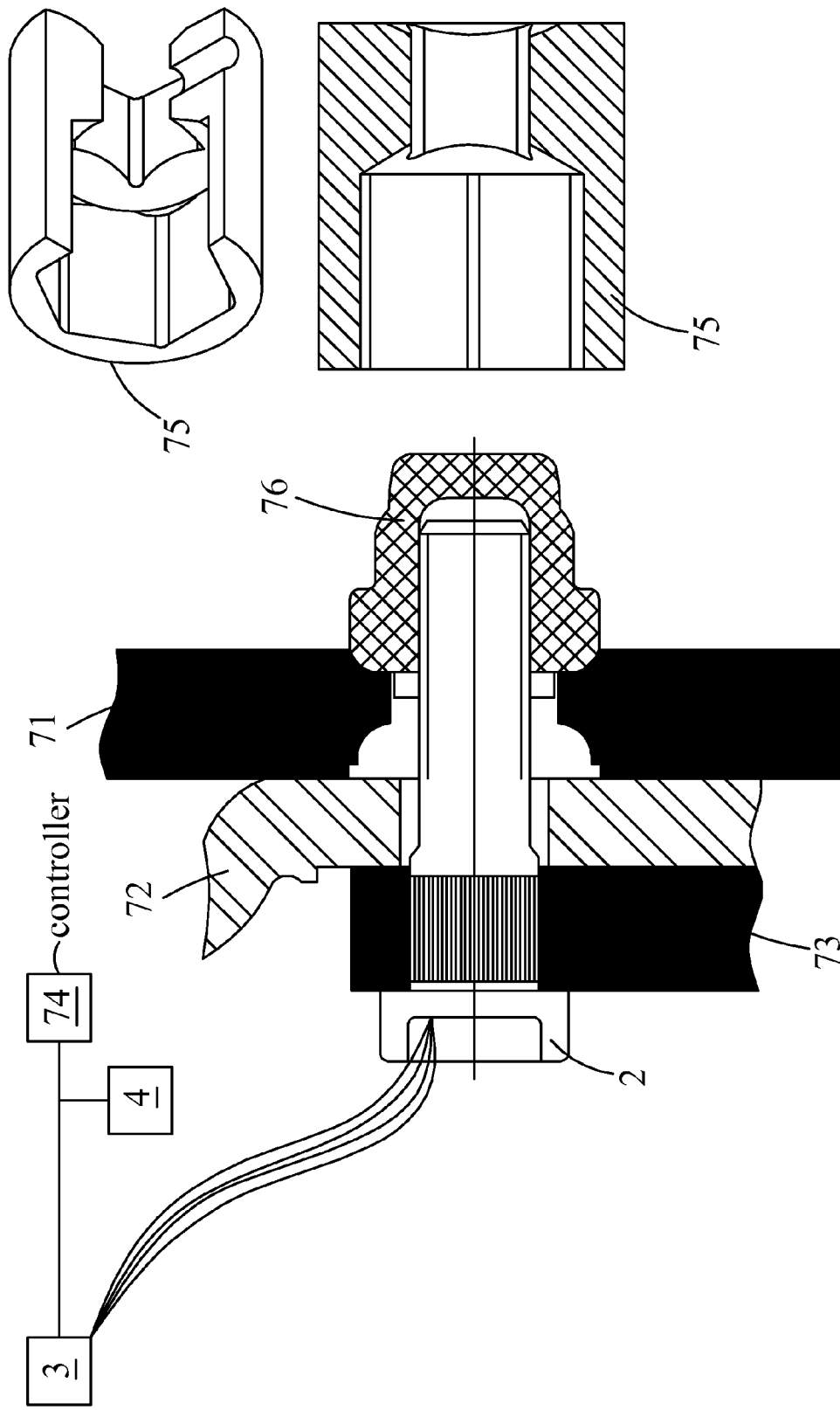
FIG. 8 is the first schematic view of applying the sensing device of the apparatus capable of controlling, tracking and measuring the tightening torque and the locking force in accordance with the present invention in assembling the wheel rim (such as an aluminum alloy wheel rim), the brake drum and the wheel hub of the mobile vehicle.

On the other hand, according to the aforementioned embodiments, the apparatus capable of controlling, tracking and measuring the tightening torque and the locking force in accordance with the present invention can be applied in assembling the wheel rim (aluminum alloy wheel rim) 71, the brake drum 72 and the wheel hub 73 of the mobile vehicle. Please refer to FIG. 8 and FIG. 9, and also refer to FIGS. 1~7. FIG. 8 is the first schematic view of applying the sensing device of the apparatus capable of controlling, tracking and measuring the tightening torque and the locking force in accordance with the present invention in assembling the wheel rim (aluminum alloy wheel rim), the brake drum and the wheel hub of the mobile vehicle. As shown in FIGS, the sensing device 2 of the apparatus capable of controlling, tracking and measuring the tightening torque and the locking force can be a plurality of hexagon head bolts (or socket head bolts and so on). The sensing device 2 can be placed in or disposed in the preset hole of the wheel hub 73, and the first connector 20 thereof and the connectors of other bolt with the same sensing device of the wheel hub 73 can be electrically coupled to an external transducing device 3. In this way, the sensing data 210 and the device identification code 220 sensed by each bolt can be wiredly or wirelessly transmitted to the controller 74 of the mobile vehicle (such as a vehicular computer) to monitor the variation of the tightening torque or and the locking force of each bolt. The sensing data 210 and the device identification code 220 sensed by each bolt can also be wiredly or wirelessly transmitted to the control device 4 for the user to measure the variation of the tightening torque and the locking force of each bolt at any time. During the tightening operation, the user can place any tightening tool combined with the conventional socket 75 on the cap nut 76 to apply a torque in order to control the tightening torque and the locking force of each sensing device.

Figure 9:
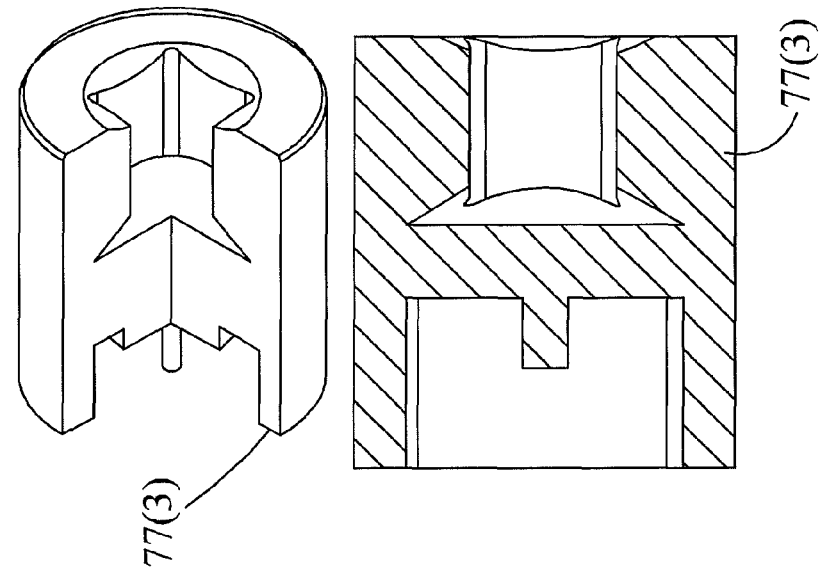
FIG. 9 is the second schematic view of applying the sensing device of the apparatus capable of controlling, tracking and measuring the tightening torque and the locking force in accordance with the present invention in assembling the wheel rim (such as an aluminum alloy wheel rim), the brake drum and the wheel hub of the mobile vehicle.
Figure 9:
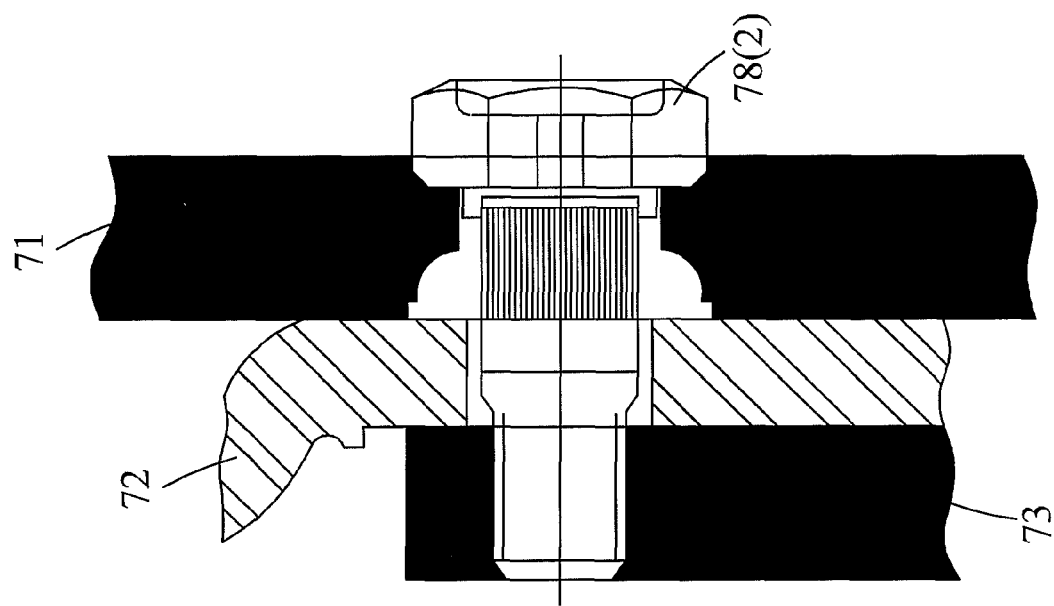

FIG. 9 is the second schematic view of applying the sensing device of the apparatus capable of controlling, tracking and measuring the tightening torque and the locking force in accordance with the present invention in assembling the wheel rim (aluminum alloy wheel rim), the brake drum and the wheel hub of the mobile vehicle. As shown in FIG. 9, the sensing device 2 of the apparatus capable of controlling, tracking and measuring the tightening torque and the locking force can be a plurality of hexagon head bolts (or socket head bolt and so on). The transducing socket designed with the transducing device according to the present invention can be placed on the sensing bolt 78 designed with the sensing device 2 according to the present invention. After engaging the transducing socket 77 electrically coupled to the sensing bolt 78, a torque can be applied to screw the sensing bolt 78 into the preset threaded hole of the wheel hub 73 so as to tighten the wheel rim (aluminum alloy wheel rim) 71 and the brake drum 72. In this way, as described in the embodiment of FIG. 6, the tightening torque and the locking force of each sensing bolt designed with the sensing device can be measured and monitored in time.

Wherein, the detailed description and implementation method of the aforementioned sensing device 2 have been described in the section of the sensing device of the apparatus capable of controlling, tracking and measuring the tightening torque and the locking force in accordance with the present invention already, and thus will not be repeated. Moreover, the transducing device 3 can be wiredly or wirelessly coupled to the sensing device to read out the device identification device at any time and transmit the sensing data to the first microprocessor. Then, the device identification code and the sensing data can be wiredly or wirelessly transmitted to the control device by the first microprocessor so as to display or control which in real time.

Besides, the aforementioned embodiments are just examples, not limitations, and the present invention can be implemented in different ways. Moreover, the drawing are just illustrations, not limitations. The present invention can be adjusted according to actual requirements when being implemented.

Figure 10A:
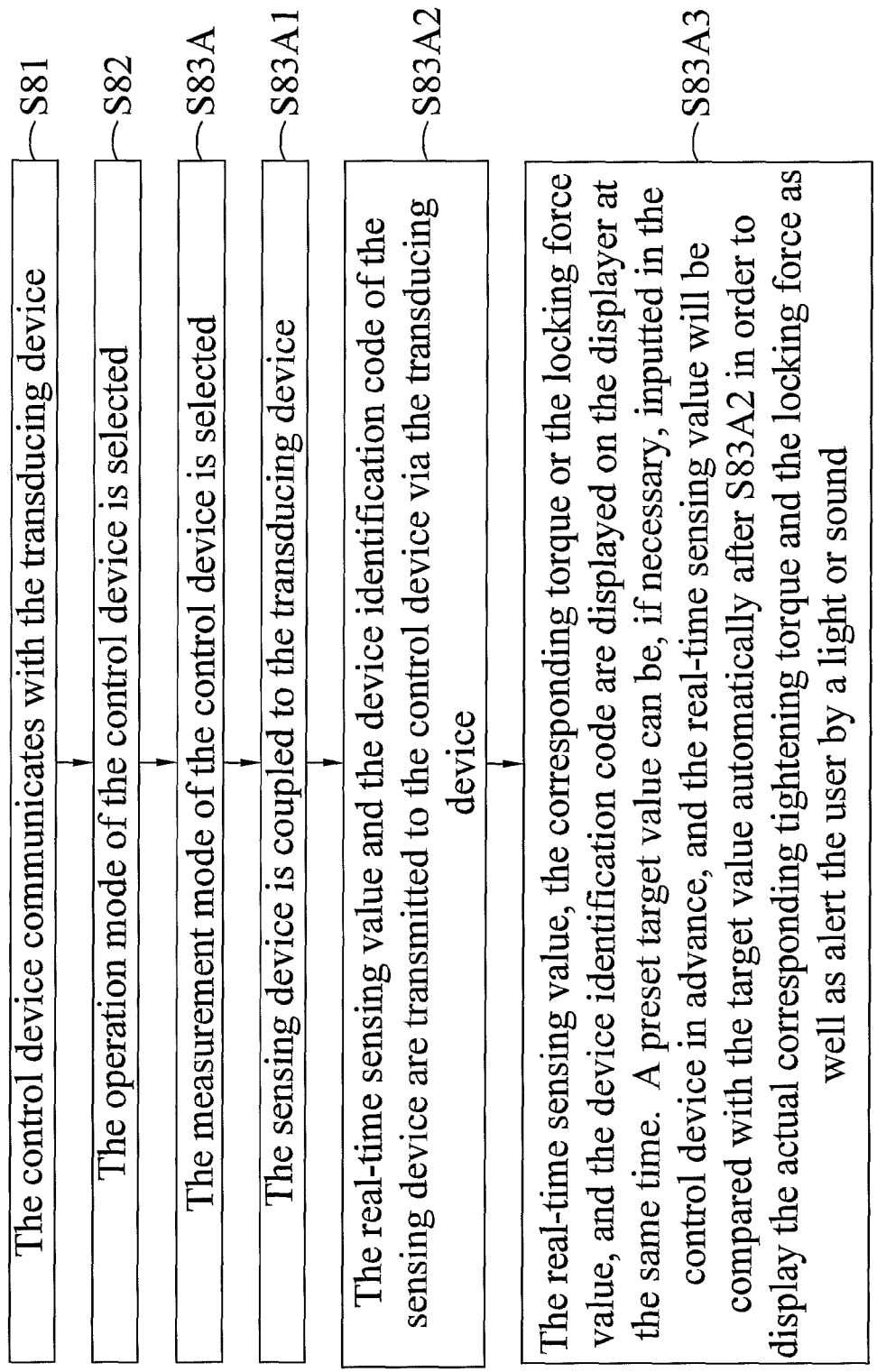
FIG. 10A is the first flow chart of the control method of the apparatus capable of controlling, tracking and measuring the tightening torque and the locking force in accordance with the present invention.
Figure 10B:
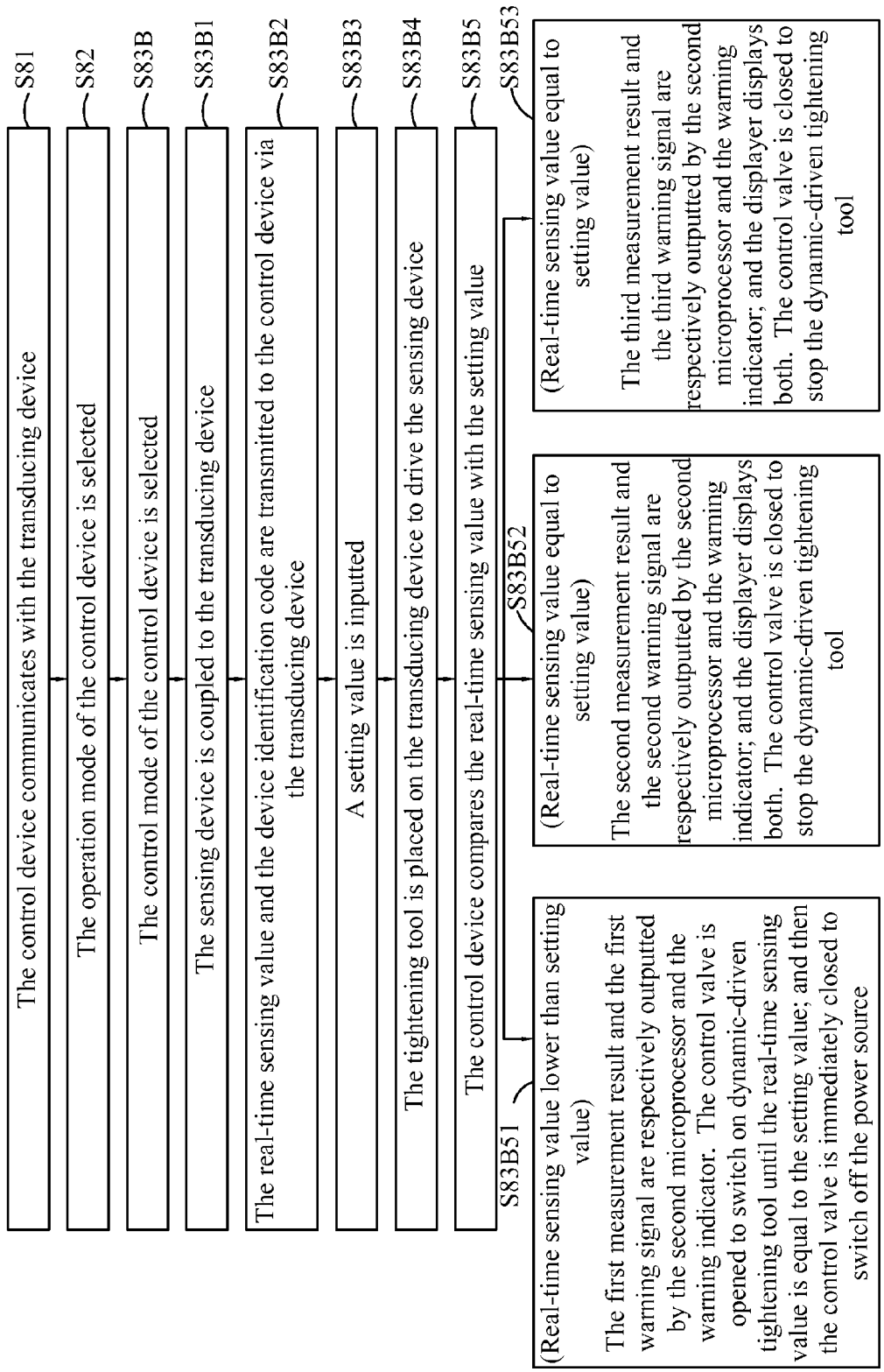
FIG. 10B is the second flow chart of the control method of the apparatus capable of controlling, tracking and measuring the tightening torque and the locking force in accordance with the present invention.

Please refer to FIG. 10A and FIG. 10B. FIG. 10A is the first flow chart of the control method of the apparatus capable of controlling, tracking and measuring the tightening torque and the locking force in accordance with the present invention. FIG. 10B is the second flow chart of the control method of the apparatus capable of controlling, tracking and measuring the tightening torque and the locking force in accordance with the present invention. As shown in FIGS, the apparatus capable of controlling, tracking and measuring the tightening torque and the locking force can be utilized to control the locking force and the tightening torque applied to a fastener by a tightening tool. The apparatus capable of controlling, tracking and measuring the tightening torque and the locking force comprises a sensing device, a transducing device, and a control device. The sensing device can be the main body of the fastener. The transducing device can couple with the sensing device to drive the fastener, or disposed in an externally independent unit, and wiredly or wirelessly transmit the device identification code and the sensing data received from the sensing device to the control device. The control device can be disposed in a dynamic-driven tightening tool or in an externally independent box in order to control the tightening operation of a dynamic-driven tightening tool or a manual-driven tightening tool. The control method comprises the following steps of:

In S81, the first signal transmitter of the transducing device is coupled to the second signal transmitter of the control device in order to allow the control device to communicate the transducing device.

In S82, the control device is controlled to perform measurement operation or the tightening operation by selecting the operation mode of the control device, such as the measurement mode or the control mode. Wherein, if the measurement mode of the control device is selected, the steps goes to S83A: selecting the measurement mode, which comprises the following steps of:

In S83A1, the sensing device is electrically coupled to the transducing device by engaging the first connector of the sensing device with the second connector of the transducing device.

In S82A2, the device identification code and the sensing data are read out by the transducing device, and the amplifying circuit of the transducing device receives and amplifies the sensing data. The first microprocessor of the transducing device receives the amplified sensing data and converts the amplified sensing data from the analog signal to the digital signal to form the real-time sensing value. Next, the device identification code and the real-time sensing value are transmitted to the control device, and displayed on the displaying device of the control device in order to immediately obtain the locking force or the tightening torque applied to the sensing device before the measurement operation.

In S83A3, the real-time sensing value, the corresponding torque or the locking force value, and the device identification code are displayed on the displaying device at the same time. A preset target value can be, if necessary, inputted in the control device in advance, and the real-time sensing value will be compared with the target value automatically after S83A2 in order to display the actual corresponding tightening torque and the locking force as well as alert the user by a light or sound.

Wherein, when the control mode of the control device is selected, the steps go to S83B: selecting the control mode, which comprises the following steps of:

In S83B1, the sensing device is electrically coupled to the transducing device by engaging the first connector of the sensing device with the second connector of the transducing device.

In S83B2, the device identification code and the real-time sensing value are read out by the transducing device, and the sensing data of the sensing device are transmitted to the transducing device. The sensing data are received and amplified by the amplifying circuit of the transducing device. The amplified sensing data are received by the first microprocessor of the transducing device and converted from the analog signal to the digital signal to form the real-time sensing value. Next, the device identification code and the real-time sensing value are transmitted to the control device and displayed on the displaying device of the control device in order to immediately determine the locking force or the tightening torque applied to the sensing device before the tightening operation.

In S83B3, a setting value of the locking force and the tightening torque is inputted in the control device.

In S83B4, the tightening tool is placed on the transducing device to drive the sensing device.

In S83B5, the real-time sensing value is received and compared with the setting value by the second microprocessor of the control device. When the real-time sensing value is lower than the admissible range of the setting value, the steps go to S83B51: the second microprocessor outputs the first measurement result and the warning device of the control device outputs the first warning signal; in the meanwhile, the control valve of the control device is opened and the dynamic-driven tightening tool can be immediately switched on until the real-time sensing value is equal to the admissible range of the setting value; and then the control valve immediately blocks the driving power of the dynamic-driven tightening tool to stop the dynamic-driven tightening tool.

When the real-time sensing value is equal to the admissible range of the setting value, the steps to S83B52: the second measurement result is outputted by the second microprocessor and the second warning signal is outputted by the warning device; and the driving power of the dynamic-driven tightening tool is blocked by the control valve of the control device to stop the dynamic-driven tightening tool; in the meanwhile, the second measurement result and the second warning signal are displayed on the displaying device.

When the real-time sensing value is greater than the admissible range of the setting value, the steps go to S83B53: the third measurement result is outputted by the second microprocessor and the third warning signal is outputted by the warning device; and the driving power of the dynamic-driven tightening tool is blocked by the control valve of the control device to stop the dynamic-driven tightening tool; in the meanwhile, the third measurement result and the third warning signal are displayed on the displaying device.

The detailed description and implementation method of the tightening operation of the tightening tool in accordance with the present invention have been described in the section of the apparatus capable of controlling, tracking and measuring the tightening torque and the locking force in accordance with the present invention already, and thus will not be repeated.

Figure 11:
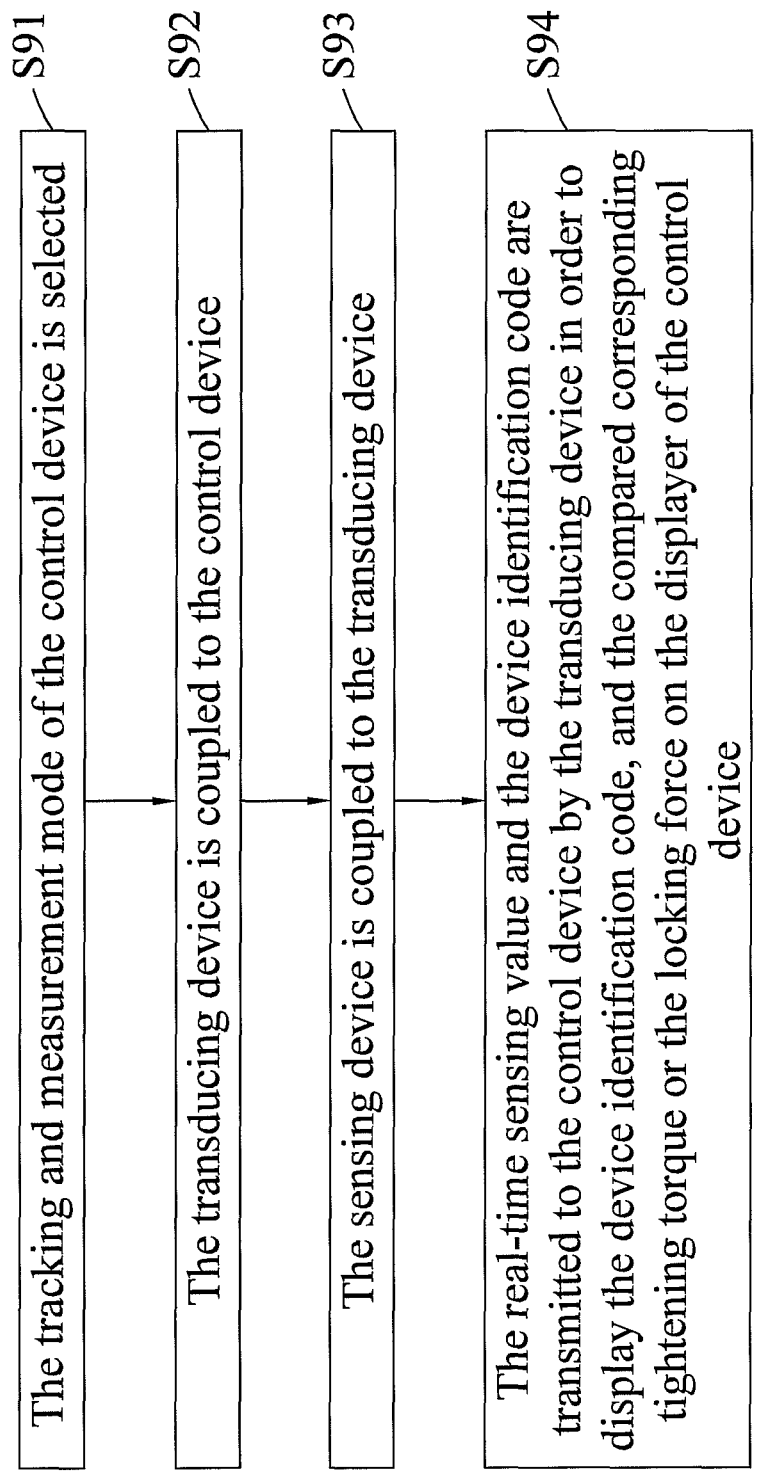
FIG. 11 is the flow chart of the tracking and measuring method of the apparatus capable of controlling, tracking and measuring the tightening torque and the locking force in accordance with the present invention.

In summation of the description above, please refer to FIG. 11. FIG. 11 is the flow chart of the tracking and measuring method of the apparatus capable of controlling, tracking and measuring the tightening torque and the locking force in accordance with the present invention. As shown in FIG. 11, the tracking and measuring method comprises the following steps of:

In S91, the tracking and measuring mode is selected via the plurality of buttons of the control device to control the control device to perform the tracking and measuring operation.

In S92, the first signal transmitter of the transducing device is connected to the second signal transmitter of the control device to allow the transducing device to communicate with the control device; and the device identification code of the sensing device is transmitted to the control device via the transducing device, and displayed on the displaying device of the control device.

In S93, the first connector of the sensing device is engaged with the second connector of the transducing device to electrically connect the sensing device with the transducing device; and the locking force and the tightening torque applied to the sensing device is sensed by the sensor of the sensing device to form the sensing data.

Next step is S94, the sensing data and the device identification code are transmitted to the transducing device by the sensing device; and the sensing data are received and amplified by the amplifying circuit of the transducing device; and the amplified sensing data are received and converted from the analog signal to the digital signal by the first microprocessor of the transducing device so as to form the real-time sensing value; and then the real-time sensing value and the device identification code are transmitted to the control device by the transducing device in order to display the device identification code, and the compared corresponding tightening torque or the locking force on the displaying device of the control device.

Figure 12A:
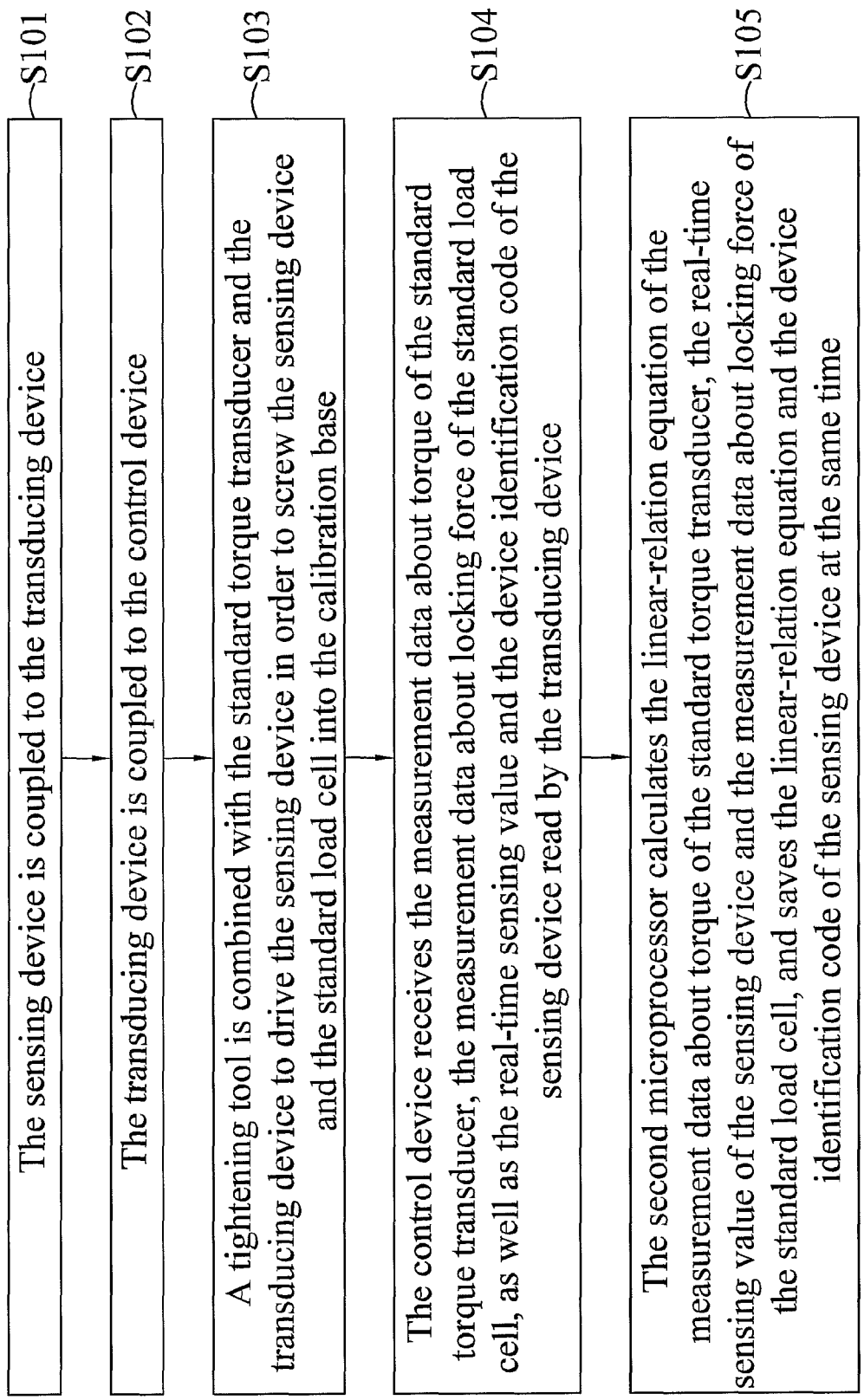
FIG. 12A is the first flow chart of the calibration method of the apparatus capable of controlling, tracking and measuring the tightening torque and the locking force in accordance with the present invention.

Please refer to FIG. 12A. FIG. 12A is the first flow chart of the calibration method of the apparatus capable of controlling, tracking and measuring the tightening torque and the locking force in accordance with the present invention. As shown in FIG. 12A, a standard torque transducer, a standard load cell and a calibration fixture can be utilized to perform calibration operation on the sensing device of the apparatus capable of controlling, tracking and measuring the tightening torque and the locking force. The apparatus capable of controlling, tracking and measuring the tightening torque and the locking force further comprises a transducing device and a control device. The calibration method of the sensing device comprises the following steps of:

In S101, the sensing device is electrically connected to the transducing device by engaging the first connector of the sensing device with the second connector of the transducing device.

In S102, the first signal transmitter of the transducing device is connected to the second signal transmitter of the control device to allow the transducing device to communicate with the control device; and a device identification code is transmitted from the sensing device to the control device via the transducing device, and displayed on the displaying device of the control device.

Next step is S103, the sensing device is plugged into the standard load cell, and the sensing device and the standard load cell are electrically connected to the control device; and then a tightening tool coupled with the standard torque transducer and the transducing device are utilized to apply the locking force and the tightening torque to the standard load cell to screw the sensing device and the standard load cell into the calibration fixture.

In S104, the second microprocessor of the control device receives the measurement data about torque of the standard torque transducer, the measurement data about locking force of the standard load cell, as well as the real-time sensing value and the device identification code of the sensing device read by the transducing device.

In S105, the measurement data about torque of the standard torque transducer, the real-time sensing value of the sensing device and the measurement data about locking force of the standard load cell are compared by the second microprocessor in order to calculate the linear-relation equation of the measurement data about torque of the standard torque transducer, the real-time sensing value of the sensing device and the measurement data about locking force of the standard load cell. The linear-relation equation and the device identification code of the sensing device are saved in the second microprocessor or an independent memory device.

Figure 12B:
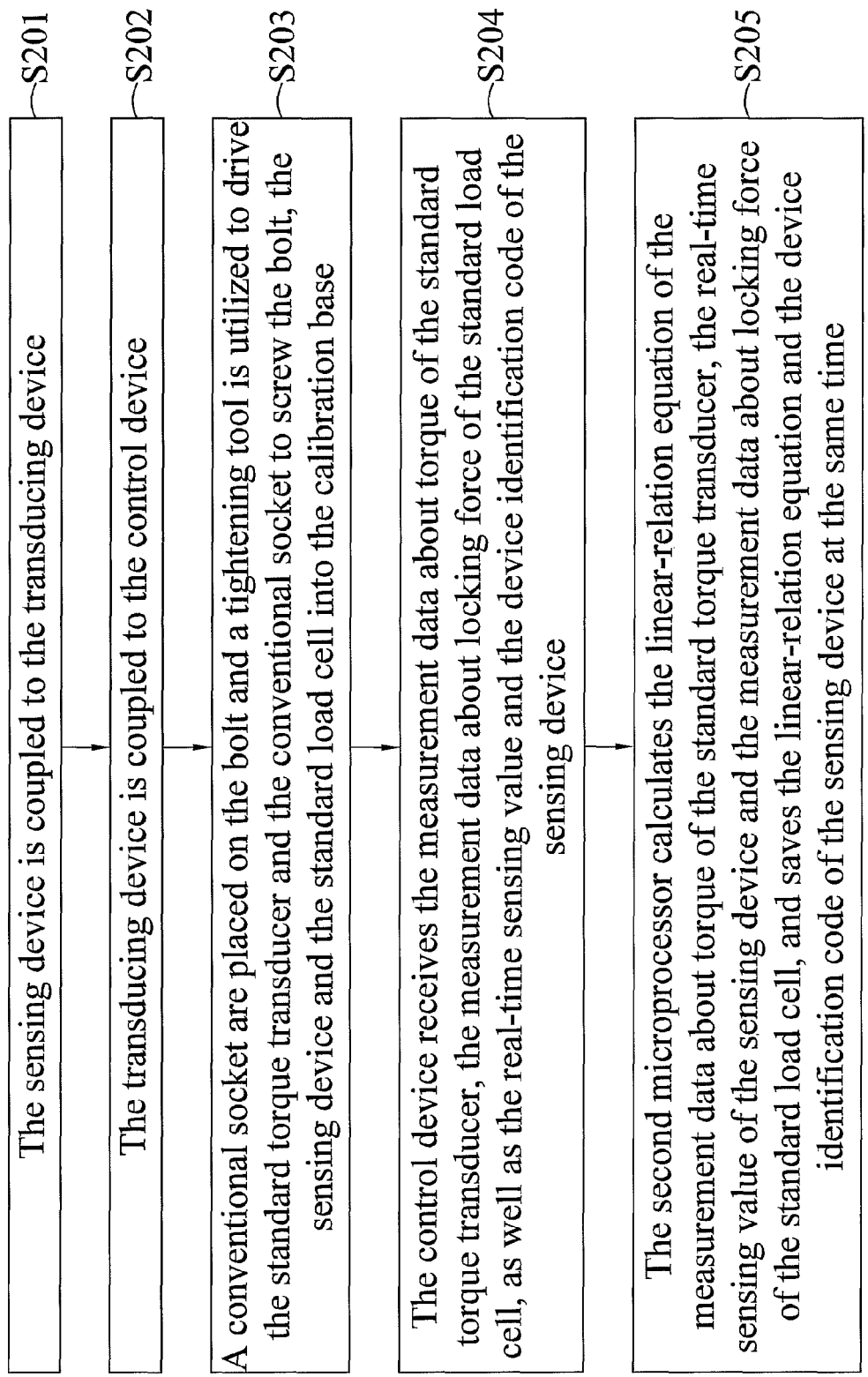
FIG. 12B is the second flow chart of the calibration method of the apparatus capable of controlling, tracking and measuring the tightening torque and the locking force in accordance with the present invention.

Please refer to FIG. 12B. FIG. 12B is the second flow chart of the calibration method of the apparatus capable of controlling, tracking and measuring the tightening torque and the locking force in accordance with the present invention. As shown in FIG. 12B, a standard torque transducer, a standard load cell and a calibration fixture can be utilized to perform calibration operation on the sensing device of the apparatus capable of controlling, tracking and measuring the tightening torque and the locking force. The apparatus capable of controlling, tracking and measuring the tightening torque and the locking force further comprises an external transducing device and a control device. The calibration method of the sensing device comprises the following steps of:

In S201, the sensing device is electrically connected to the transducing device by engaging the first connector of the sensing device with the second connector of the transducing device.

In S202, the first signal transmitter of the transducing device is connected to the second signal transmitter of the control device wiredly or wirelessly to allow the transducing device to communicate with the control device; and a device identification code is transmitted to the control device via the transducing device, and displayed on the displaying device of the control device.

Next step is S203, the sensing device is plugged into the standard load cell, and the sensing device and the standard load cell are electrically connected to the control device; and then a tightening tool combined with the standard torque transducer and a conventional socket are utilized to apply the locking force or the tightening torque to the bolt of corresponding size via the conventional socket to make the bolt pass through the sensing device of a standard load cell in order to screw the sensing device and the standard load cell into the calibration fixture.

In S204, the second microprocessor of the control device receives the measurement data about torque of the standard torque transducer, the measurement data about locking force of the standard load cell, as well as the real-time sensing value and the device identification code of the sensing device.

In S205, the measurement data about torque of the standard torque transducer, the real-time sensing value of the sensing device and the measurement data about locking force of the standard load cell are compared by the second microprocessor in order to calculate the linear-relation equation of the measurement data about torque of the standard torque transducer, the real-time sensing value of the sensing device and the measurement data about locking force of the standard load cell. The linear-relation equation and the device identification code of the sensing device are saved in the second microprocessor or an independent memory device.

Wherein, in the aforementioned steps, the transducing device can further communicate with an external data processing device. The external processing device can receive the measurement data about torque of the standard torque transducer, the device identification code and the real-time sensing value of the sensing device, and the measurement data about locking force of the standard load cell. After the aforementioned data are compared, the linear-relation equation of the measurement data about torque of the standard torque transducer, the real-time sensing value of the sensing device and the measurement data about locking force of the standard load cell are calculated and saved in an independent memory device.

Moreover, since the variation of the temperature will directly influence and result in the variation of the tightening torque and the locking force, a compensating parameter of automatically temperature sensing cam be inputted according to the measurement result during the calibration process to immediately modify the locking force or the tightening torque sensed by the sensing device in all temperature conditions so as to obtain accurate measurement data and achieve the goal of precise control.

In summation of the description above, by connecting the sensing device, the transducing device and the control device, the apparatus and the method capable of controlling, tracking and measuring the tightening torque and the locking force can immediately measure and control the tightening operation of the tightening tool to prevent from excessive or insufficient force apply to the tightening tool. Thus, the fastener will not be damaged or drop off. Besides, by connecting the sensing device and the transducing device, the locking force and the tightening torque of the fastener can be tracked continuously or randomly to prevent from the accidents caused by the fastener dropping off without warning. Moreover, the linear-relation equation of the control device and the sensing device can be obtained via the calibration method of the sensing device. The linear-relation equation can be further utilized to adjust the setting parameter of the control device in order to better the measurement result and the control precision of the apparatus capable of controlling, tracking and measuring the tightening torque and the locking force in accordance with the present invention. In the meanwhile, the linear-relation equation can also be utilized to manufacture the sensing device so as to manufacture high-precision sensing device.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. An apparatus capable of controlling, tracking and measuring a locking force and a tightening torque, applicable to measure and control the locking force or the tightening torque applied to a fastener by a tightening tool, or applicable to track the locking force or the tightening torque of the fastener, comprising:
   a control device, communicating with a transducing device of the apparatus capable of controlling, tracking and measuring a locking force and a tightening torque, the control device receiving a real-time sensing value or a device identification code via the transducing device so as to measure and control the locking force or the tightening torque applied to a sensing device of the apparatus capable of controlling, tracking and measuring the locking force and the tightening torque by the tightening tool, or tracking and measuring the locking force or the tightening torque applied to the sensing device, wherein the control device comprises:
   a second signal transmitter, being a wired or wireless communication device, and communicating with a first signal transmitter of the transducing device in order to receive the real-time sensing value or the device identification code;
   a plurality of buttons, being used for inputting a setting value or choosing an operation mode of the control device;
   a microprocessor, electrically connected to the second signal transmitter and the plurality of buttons, and the microprocessor receiving the real-time sensing value or the device identification code, and comparing the setting value with the real-time sensing value in order to output a first measurement result, a second measurement result or a third measurement result;
   a warning device, electrically connected to the microprocessor, and respectively outputting a first warning signal, a second warning signal or a third warning signal according to the first measurement result, the second measurement result or the third measurement result;
   a displaying device, electrically to the microprocessor and the warning device, the displaying device displaying the device identification code, the first measurement result, the second measurement result, the third measurement result, the first warning signal, the second warning signal or the third warning signal;
   a second power supply, electrically connected to the second signal transmitter, the microprocessor, the buttons, the warning device and the displaying device in order to provide a second working voltage;
   a power source, for providing a power to the tightening tool, the power further comprising a electrical power, a pneumatic power, or a hydraulic power;
   a power regulator, selectively connected to a output of the power source, when the power source is the pneumatic power, the power regulator adjusts the pneumatic pressure outputted by the power source;
   a pressure sensor, connected to the microprocessor, the second power supply and the power regulator, when the power source is the pneumatic power or the hydraulic power, the pressure sensor will measure the pneumatic pressure or the hydraulic pressure adjusted by the power regulator; and
   a control valve, connected to the microprocessor, the pressure sensor and the second power supply, when the microprocessor outputs the second measurement result or the third measurement result, the control valve blocks the power outputted by the power source;
   wherein, when the real-time sensing value is lower than the admissible range of the setting value, the microprocessor outputs the first measurement result; when the real-time sensing value is equal to the admissible range of the setting value, the microprocessor outputs the second measurement result; and when the real-time sensing value is higher than the admissible range of the setting value, the microprocessor outputs the third measurement result.

2. An apparatus capable of controlling, tracking and measuring a locking force and a tightening torque, applicable to measure and control the locking force or the tightening torque applied to a fastener by a tightening tool, or applicable to track the locking force or the tightening torque of the fastener, comprising:
   a sensing device, applicable to sense the locking force or the tightening torque applied to the fastener, wherein the sensing device comprises:
   a first connector, disposed on the head of the sensing device;
   a sensor, electrically connected to the first connector, and sensing the locking force or the tightening torque applied to the sensing device so as to output sensing data to the first connector; and
   an identifier, electrically connected to the first connector, and having an device identification code, the identifier transmitting the device identification code to the first connector, and the device identification code comprising at least one device serial number, a device material serial number or a device maximum locking force;
   a transducing device, connected to the sensing device, applicable to receive and transmit the sensing data or the device identification code to the control device, wherein the transducing device comprises:
   a second connector, disposed on one end of the transducing device, receiving and outputting the sensing data and the device identification code;
   an amplifying circuit, electrically connected to the second connector, receiving and amplifying the sensing data;
   a first microprocessor, electrically connected to the amplifying circuit, and comprising a signal convertor, the signal convertor receiving the amplified sensing data, and converting the amplified sensing data from a analog signal to a digital signal in order to form a real-time sensing value;
   a first signal transmitter, being a wired or wireless communication device, and electrically connected to the first microprocessor, and the first signal transmitter receiving and transmitting the real-time sensing value; and
   a first power supply, electrically connected to the second connector, the amplified circuit, the first microprocessor and the first signal transmitter, providing a first working voltage; and
   a control device, communicating with the transducing device, the control device receiving the real-time sensing value and the device identification code via the transducing device in order to measure and control the locking force or the tightening torque applied to the sensing device by the tightening tool, or tracking and measuring the locking force or the tightening torque applied to the sensing device, wherein the control device comprises:

a second signal transmitter, being a wired or wireless communication device, and communicating with the first signal transmitter of the transducing device in order to receive the real-time sensing value or the device identification code;

a plurality of buttons, electrically connected to the second microprocessor, being used for inputting a setting value or choosing an operation mode of the control device;

a second microprocessor, electrically connected the second signal transmitter, and second microprocessor receiving the real-time sensing value or the device identification code, and comparing the setting value with the real-time sensing value in order to output a first measurement result, a second measurement result or a third measurement result;

a warning device, electrically connected to the second microprocessor, and respectively outputting a first warning signal, a second warning signal or a third warning signal according to the first measurement result, the second measurement result or the third measurement result;

a displaying device, electrically connected to the second microprocessor and the warning device, the displaying device displaying the device identification code, the first measurement result, the second measurement result, the third measurement result, the first warning signal, the second warning signal or the third warning signal;

a second power supply, electrically connected to the second signal transmitter, the second microprocessor, the buttons, the warning device and the displaying device in order to provide a second working voltage;

a power source, for providing a power to the tightening tool, the power further comprising an electrical power, a pneumatic power, or a hydraulic power;

a power regulator, selectively connected to an output of the power source, when the power source is the pneumatic power, the power regulator adjusts the pneumatic pressure outputted by the power source;

a pressure sensor, connected to the second microprocessor, the second power supply and the power regulator, when the power source is the pneumatic power or the hydraulic power, the pressure sensor will measure the pneumatic pressure or the hydraulic pressure adjusted by the power regulator; and a control valve, connected to the second microprocessor, the pressure sensor and the second power supply, when the second microprocessor outputs the second measurement result or the third measurement result, the control valve blocks the power outputted by the power source;

wherein, when the real-time sensing value is lower than the admissible range of the setting value, the second microprocessor outputs the first measurement result; when the real-time sensing value is equal to the admissible range of the setting value, the second microprocessor outputs the second measurement result; and when the real-time sensing value is higher than the admissible range of the setting value, the second microprocessor outputs the third measurement result.

3. The apparatus capable of controlling, tracking and measuring the locking force and the tightening torque of claim 2, wherein the first connector is engaged with the second connector to electrically connect to the second connector, or the first connector is connected to the second connector via wires to electrically connect to the second connector.

4. A control method for an apparatus capable of controlling, tracking and measuring a tightening torque and a locking force, applicable to use the apparatus capable of controlling, tracking and measuring the tightening torque and the locking force to control the tightening torque and the locking force applied to a fastener by a tightening tool, the apparatus capable of controlling, tracking and measuring the tightening torque and the locking force comprising a sensing device, a transducing device and a control device, the control method comprising the following steps of:

connecting a first signal transmitter of the transducing device to a second signal transmitter of the control device so as to allow the control device to communicate with the transducing device;

choosing an operation mode by a plurality of buttons of the control device in order to control the control device to perform a tightening operation or a measurement operation;

engaging a first connector of the sensing device with a second connector of the transducing device in order to electrically connect the sensing device to the transducing device;

reading out a device identification code of the sensing device via the transducing device and displaying the device identification code on a displaying device of the control device;

transmitting sensing data to the transducing device via the first connector and the second connector;

receiving and amplifying the sensing data by an amplifying circuit of the transducing device;

receiving the amplified sensing data and converting the amplified data from an analog signal to a digital signal by a first microprocessor of the transducing device in order to form a real-time sensing value;

transmitting the real-time sensing value from the transducing device to the control device via the first signal transmitter and the second signal transmitter;

inputting a setting value;

coupling the tightening tool to the transducing device to rotate the sensing device;

comparing the real-time sensing value with the setting value by a second microprocessor of the control device;

outputting a first measurement result by the second microprocessor and outputting a first warning signal by a warning device of the control device when the real-time sensing value is lower than the admissible range of the setting value;

outputting a second measurement result by the second microprocessor and outputting a second warning signal by the warning device when the real-time sensing value is equal to the admissible range of the setting value;

outputting a third measurement result by the second microprocessor and outputting a third warning signal by the warning device when the real-time sensing value is higher than the admissible range of the setting value; and displaying the first measurement result, the second measurement result, the third measurement result, the first warning signal, the second warning signal or the third warning signal on the displaying device.

5. The control method for an apparatus capable of controlling, tracking and measuring a tightening torque and a locking force of claim 4, further comprising the following steps of:

receiving the second measurement result or the third measurement result by a control valve of the control device when the tightening tool is a dynamic-driven tightening tool; and blocking a driving power of the dynamic-driven tightening tool by the control valve.

6. A calibration method for an apparatus capable of controlling, tracking and measuring a tightening torque and a locking force, performing a calibration operation on a sensing device of the apparatus capable of controlling, tracking and measuring the tightening torque and the locking force by a standard torque transducer, a standard load cell and a calibration fixture, the apparatus capable of controlling, tracking and measuring the tightening torque and the locking force further comprising a transducing device and a control device, the calibration method comprising the following steps of:

engaging a first connector of the sensing device with a second connector of the transducing device to electrically connect the sensing device and the transducing device;

connecting a first signal transmitter of the transducing device to a second signal transmitter of the control device to allow the transducing device to communicate with the control device;

transmitting a device identification code to the control device by the sensing device via the transducing device and displaying the device identification code on a displaying device of the control device;

plugging the sensing device into the standard load cell to wait for being screwed into the calibration fixture;

electrically connecting the sensing device and the standard load cell to the control device;

coupling a tightening tool with the standard torque transducer and the transducing device to apply a tightening torque to the standard load cell and drive the sensing device in order to screw the sensing device and the standard load cell into the calibration fixture;

receiving measurement data of the tightening torque of the standard torque transducer, a real-time sensing value of the sensing device and the measurement data of the locking force of the standard load cell by a microprocessor of the control device;

comparing and calculating the measurement data of the tightening torque of the standard torque transducer, the real-time sensing value of the sensing device and the measurement data of the locking force of the standard load cell in order to obtain a linear-relation equation of the real-time sensing value of the sensing device, the measurement data of the locking force of the standard load cell and the measurement data of the tightening torque of the standard torque transducer, and recording and saving the linear-relation equation and the device identification code in the microprocessor or an independent memory device.

* * * * *